(12) United States Patent
Alcantara et al.

(10) Patent No.: US 11,526,549 B2
(45) Date of Patent: Dec. 13, 2022

(54) METHOD AND SYSTEM FOR INTERFACING WITH A USER TO FACILITATE AN IMAGE SEARCH FOR AN OBJECT-OF-INTEREST

(71) Applicant: Avigilon Corporation, Vancouver (CA)

(72) Inventors: Tulio de Souza Alcantara, Vancouver (CA); Courtney Anne Adame Cheng, Coquitlam (CA); Roger David Donaldson, Vancouver (CA); David Flanagan, Vancouver (CA); Ken Jessen, New Westminster (CA); Eric Sjue, Port Moody (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 719 days.

(21) Appl. No.: 16/355,470

(22) Filed: Mar. 15, 2019

(65) Prior Publication Data

US 2019/0294631 A1    Sep. 26, 2019

Related U.S. Application Data

(60) Provisional application No. 62/647,305, filed on Mar. 23, 2018.

(51) Int. Cl.
*G06F 16/78* (2019.01)
*G06F 16/783* (2019.01)
(Continued)

(52) U.S. Cl.
CPC ........ *G06F 16/7837* (2019.01); *G06F 16/743* (2019.01); *G06F 16/90332* (2019.01); *G06N 3/08* (2013.01); *G06V 20/46* (2022.01)

(58) Field of Classification Search
CPC ............... G06F 16/7837; G06F 16/743; G06F 16/90332; G06K 9/00744; G06N 3/08
(Continued)

(56) References Cited

U.S. PATENT DOCUMENTS 6,108,437 A    8/2000  Lin
8,224,029 B2 *  7/2012  Saptharishi ............ H04N 7/181
                                                        382/103

(Continued)

FOREIGN PATENT DOCUMENTS

WO    2012/071677    6/2012

OTHER PUBLICATIONS

Bromley, J., et al., "Signature Verification Using a 'Siamese' Time Delay Neural Network," International Journal of Pattern Recognition and Artificial Intelligence, vol. 7, No. 4, 1993, pp. 669-688.
(Continued)

*Primary Examiner* — Hosain T Alam
*Assistant Examiner* — Robert F May
(74) *Attorney, Agent, or Firm* — Perry + Currier, Inc.

(57) ABSTRACT

Methods, systems, and techniques for performing a facet search include receiving facet search commencement user input indicating that a search for a facet is to commence; in response to the facet search commencement user input, searching one or more video recordings for the facet; and displaying, on a display, facet image search results depicting the facet, wherein the facet image search results are selected from the one or more video recordings. An artificial neural network may be used for the facet search, and that network may be trained by generating a facet image training set that comprises training images, with the training images depicting a type of facet common to the training images; and training, by using the facet image training set, that neural network to classify the type of facet when a sample image comprising the type of facet is input to that network.

19 Claims, 20 Drawing Sheets

(51) Int. Cl.
*G06N 3/08* (2006.01)
*G06F 16/9032* (2019.01)
*G06F 16/74* (2019.01)
*G06V 20/40* (2022.01)

(58) Field of Classification Search
USPC .......................................................... 707/771
See application file for complete search history.

(56) References Cited

U.S. PATENT DOCUMENTS

| | | | |
|---|---|---|---|
| 2003/0135725 A1* | 7/2003 | Schirmer | G06F 16/3326 |
| | | | 712/300 |
| 2004/0008873 A1 | 1/2004 | Sogo et al. | |
| 2006/0018522 A1 | 1/2006 | Sunzeri et al. | |
| 2008/0052312 A1 | 2/2008 | Tang et al. | |
| 2011/0078097 A1 | 3/2011 | Thornton et al. | |
| 2013/0177219 A1 | 7/2013 | Frojdh et al. | |
| 2013/0307979 A1* | 11/2013 | Chen | G06V 20/54 |
| | | | 348/148 |
| 2014/0089232 A1* | 3/2014 | Buibas | G06N 3/04 |
| | | | 706/11 |
| 2017/0154212 A1* | 6/2017 | Feris | G06V 10/772 |
| 2017/0352380 A1 | 12/2017 | Doumbouya et al. | |
| 2018/0101742 A1* | 4/2018 | Burge | G06V 40/161 |
| 2018/0157939 A1 | 6/2018 | Butt et al. | |
| 2019/0171899 A1* | 6/2019 | Cecchi | G06V 10/764 |
| 2019/0205620 A1* | 7/2019 | Yi | G06V 10/454 |
| 2019/0325605 A1* | 10/2019 | Ye | G06K 9/6277 |
| 2020/0327309 A1* | 10/2020 | Cheng | G06V 40/165 |

OTHER PUBLICATIONS

Vimalchand, C.R., "An Approach for Face Recognition System Using Convolutional Neural Network and Extracted Geometric Features", International Journal of Innovative Research in Science, Engineering and Technology, vol. 4, Issue 10, Oct. 2015, pp. 9781-9785.

International Search Report for International Application No. PCT/CA2019/050326, dated Apr. 29, 2019.

* cited by examiner

| Appearance Search Options | ✕ | ← 1006 |
|---|---|---|
| Appearance Description | Male, Jeans, T-Shirt, Red ⌄ | |

| | | |
|---|---|---|
| Type: | ⦿ Persons ○ Vehicles | ← 1008 |
| Gender: | ☐ Female ☑ Male | ← 1016 |
| Age: | Any ▸ | ← 1018 |
| Clothing Type: | Jeans, T-Shirt ▸ | |
| Clothing Color & Pattern: | Red ▸ | 1010 |
| Hair Color: | Any ▸ | |
| Footwear: | Any ▸ | |
| Accessories: | Any ▸ | |
| Date Range: | 2016-05-30 / 08:13:46PM ⊙ 2016-05-30 / 8:37:46PM ⌄ | ← 1012 |
| Cameras | All ⌄ | ← 1014 |
| | Search   Cancel | ← 1006 |

FIG. 10B

Search Options  ✕

We found various results matching your description:
You searched for: A man wearing a red t-shirt and jeans ← 1108

♟ Appearances                                99+ Results ‹

| Gender: | ☐ Female ☑ Male | ← 1016 |
| --- | --- | --- |
| Age: | Any ▸ | ← 1018 |
| Clothing Type: | Jeans, T-Shirt ▸ | ⎫ |
| Clothing Color & Pattern: | Red ▸ | ⎬ 1010 |
| Hair Color: | Any ▸ | ⎭ |

[ Search ] [ Cancel ] ← 1006

•⟩) Motion                                    99+ Results ›

ⓘ Events                                     99+ Results ›

🚗 LPR                                        99+ Results ›

| Appearance Search Options | ✕ |
|---|---|
| Personal Characteristics | ‹ |

Gender

Age ☐ 0-12  ☐ 20-60
    ☐ 13-19 ☐ 61+

Hair

| Clothing | › |
|---|---|
| Date Range  2016-05-30/08:13:46PM ⇄ 2016-05-30/08:13:46PM | › |
| Cameras  15 | › |

[Search] [Cancel]

FIG. 12B

| Appearance Search Options | ✕ |
|---|---|
| Personal Characteristics | › |
| Clothing | ‹ |

Upper Body

Lower Body

Footwear Color

| Date Range  2016-05-30/08:13:46PM ⇄ 2016-05-30/08:13:46PM | › |
| Cameras  15 | › |

[Search] [Cancel]

METHOD AND SYSTEM FOR INTERFACING WITH A USER TO FACILITATE AN IMAGE SEARCH FOR AN OBJECT-OF-INTEREST

CROSS-REFERENCE TO RELATED APPLICATION

Pursuant to 35 U.S.C. § 119(e), the present application claims priority to U.S. provisional patent application No. 62/647,305, entitled "Method and System for Interfacing with a User to Facilitate an Image Search for an Object-of-interest" and filed on Mar. 23, 2018, the entirety of which is hereby incorporated by reference herein.

TECHNICAL FIELD

The present disclosure is directed at methods, systems, and techniques for interfacing with a user to facilitate an image search for an object-of-interest.

BACKGROUND

Intelligent processing and playback of recorded video is often an important functionality to include in a video surveillance system. For example, a video surveillance system may include many cameras, each of which records video. The total amount of video recorded by those cameras, much of which is typically recorded concurrently, makes relying upon manual location and tracking of an object-of-interest appearing in the recorded video inefficient. Intelligent processing and playback of video, and in particular automated search functionality, may accordingly be used to increase the efficiency with which an object-of-interest can be identified using a video surveillance system.

SUMMARY

According to a first aspect, there is provided a method comprising: generating a facet image training set that comprises training images, wherein the training images depict a type of facet common to the training images; training, by using the facet image training set, an artificial neural network to classify the type of facet when a sample image comprising the type of facet is input to the artificial neural network; classifying the sample image using the artificial neural network to assess whether the sample image depicts the type of facet; and after the sample image has been classified, searching the sample image for the type of facet. The training images may depict the type of facet in conjunction with a type of object common to the training images.

The artificial neural network may comprise a convolutional neural network.

Training the artificial neural network may comprise recording state data of the artificial neural network corresponding to different states of the artificial neural network during the training.

The state data may be indexed to index data comprising at least one of the type of facet, identification credentials of a user who is performing the training, the training images, cameras used to capture the training images, timestamps of the training images, and a time when the training commenced.

The method may further comprise: receiving index data corresponding to an earlier state of the artificial neural network; and reverting to the earlier state of the artificial neural network by loading the state data indexed to the index data corresponding to the earlier state.

The artificial neural network may be trained by different users, the different states of the artificial neural network may comprise user states respectively corresponding to the different users, and the searching may be performed using more than one of the user states.

The searching may be performed using more than one of the user states results in intermediate search results respectively corresponding to the more than one of the user states, and the method may further comprise: weighting different images in the intermediate search results based on how frequently they occur in the intermediate search results; and determining final search results comprising the different images based on the weighting.

The object-of-interest may be a person, and the type of facet may comprise age, gender, a type of clothing, a color of clothing, a pattern displayed on clothing, a hair color, a footwear color, or clothing accessories.

Additionally or alternatively, the object-of-interest may be a vehicle, and the type of facet may comprise color, make, model, or configuration.

At least one of the training images may comprise an image chip derived from an image captured by a camera.

Classifying the sample image using the artificial neural network to assess whether the sample image depicts the type of facet may comprise generating and storing metadata indicating whether the sample image depicts the type of facet, and searching the sample image for the type of facet may be performed using the metadata.

The method may further comprise: receiving facet search commencement user input indicating that a search for a facet is to commence, wherein the searching is performed in response to receiving the facet search commencement user input; and displaying, on a display, facet image search results depicting the facet, wherein the facet image search results are selected from the one or more video recordings, wherein the image search results depict the facet in conjunction with a type of object-of-interest common to the image search results.

According to another aspect, there is provided a method comprising: receiving facet search commencement user input indicating that a search for a facet is to commence; in response to the facet search commencement user input, searching one or more video recordings for the facet; and displaying, on a display, facet image search results depicting the facet, wherein the facet image search results are selected from the one or more video recordings. The image search results may depict the facet in conjunction with a type of object-of-interest common to the image search results.

The method may further comprise, after displaying the facet image search results: receiving object-of-interest search commencement user input indicating that a search for an object-of-interest is to commence; in response to the object-of-interest search commencement user input, searching the one or more video recordings for the object-of-interest; and displaying, on the display, object-of-interest search results depicting the object-of-interest.

The one or more video recordings that are searched may be the one or more video recordings from which are selected the facet image search results, the object-of-interest search results may be selected from the one or more video recordings from which are selected the facet image search results, and the object-of-interest search results may depict the object-of-interest and the facet.

The method may further comprise, after displaying the object-of-interest search results: receiving updated facet search commencement user input indicating that an updated facet search is to commence; in response to the updated facet search commencement user input, searching the one or more video recordings from which are selected the object-of-interest search results for a different type or number of facets than were searched in the search for the facet; and displaying, on the display, updated facet search results depicting the different type or number of facets and the object-of-interest, wherein the updated facet search results are selected from the one or more video recordings from which are selected the object-of-interest search results.

The method may further comprise, before displaying the facet image search results: receiving object-of-interest search commencement user input indicating that a search for an object-of-interest is to commence; in response to the object-of-interest search commencement user input, searching one or more video recordings for the object-of-interest; and displaying, on the display, object-of-interest search results depicting the object-of-interest, wherein the object-of-interest search results are selected from the one or more video recordings, wherein the facet search commencement user input is received after the object-of-interest search results are displayed, and the one or more video recordings that are searched for the facet comprise the one or more video recordings from which are selected the object-of-interest search results.

The method may further comprise: prior to receiving the facet search commencement user input, displaying a list of facets appearing in object-of-interest search results; and receiving, as the facet search commencement user input, a selection of a facet comprising the list of facets.

The facet search commencement user input may comprise a natural language text query.

According to another aspect, there is provided a method in which an artificial neural network is trained using a facet image training set as described in accordance with any suitable ones of the above described aspects, and the trained network is then used to perform a facet search as described in accordance with any suitable ones of the above described aspects.

According to another aspect, there is provided a system comprising: a display; an input device; a processor communicatively coupled to the display and the input device; and a memory communicatively coupled to the processor and having stored thereon computer program code that is executable by the processor, wherein the computer program code, when executed by the processor, causes the processor to perform the method of any of the above aspects or suitable combinations thereof.

According to another aspect, there is provided a non-transitory computer readable medium having stored thereon computer program code that is executable by a processor and that, when executed by the processor, causes the processor to perform the method of any of the above aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Reference will now be made, by way of example, to the accompanying drawings:

FIGS. 10A-10E depict a user interface page or portions thereof in various states while a facet search is being performed, according to another example embodiment.

FIGS. 11A-11E depict a user interface page or portions thereof in various states when a natural language facet search is being performed, according to another example embodiment.

FIGS. 12A, 12B, 13A, and 13B depict menus allowing a user to select various facets, according to additional example embodiments.

Similar or the same reference numerals may have been used in different figures to denote similar example features illustrated in the drawings.

DETAILED DESCRIPTION OF EXAMPLE EMBODIMENTS

Figure 1:
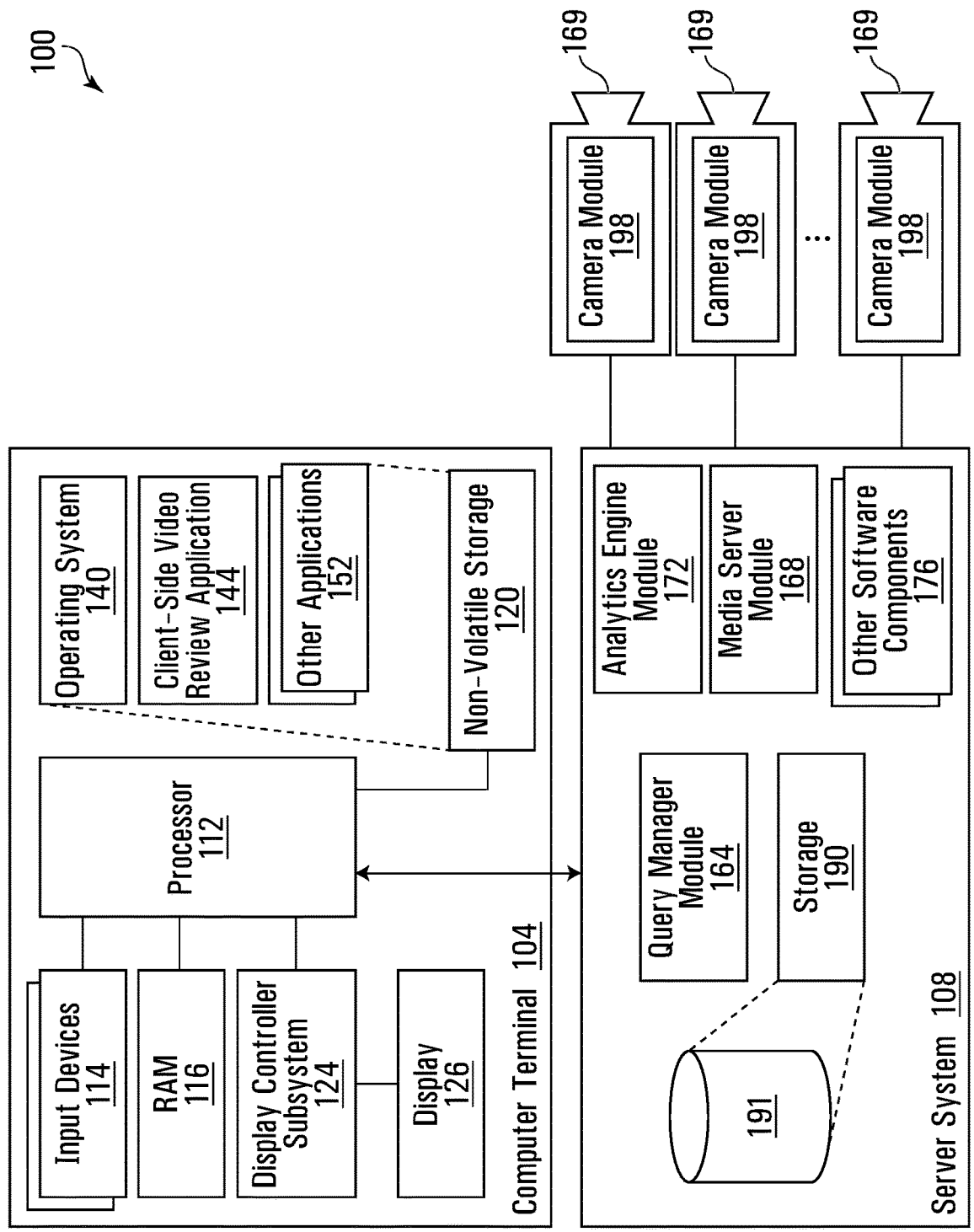
FIG. 1 shows a block diagram of an example video surveillance system within which methods in accordance with example embodiments can be carried out.

It will be understood that when an element is herein referred to as being "connected", "in communication with"

or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

As will be appreciated by one skilled in the art, the various example embodiments described herein may be embodied as a method, system, or computer program product. Accordingly, the various example embodiments may take the form of, for example, an entirely software embodiment (including firmware, resident software, micro-code, etc.) or, as another example, an embodiment combining software and hardware aspects that may all generally be referred to herein as a "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The actual programming language selected is a matter of design choice and, as will be appreciated by those skilled in the art, any suitable programming language can be utilized.

Various example embodiments are described below with reference to flowchart illustration(s) and/or block diagrams of methods, apparatus (systems) and computer program products according to various embodiments. Those skilled in the art will understand that various blocks of the flowchart illustration(s) and/or block diagrams, and combinations of blocks in the flowchart illustration(s) and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

This disclosure describes various example embodiments. It is contemplated that any part of any example embodiment described herein may be implemented or combined with any part of any other example embodiment described herein.

Reference is now made to FIG. 1 which shows a block diagram of an example surveillance system 100 within which methods in accordance with example embodiments can be carried out. Included within the illustrated surveillance system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems [not shown]. The display controller subsystem 124 interacts with display 126 and it renders graphics and/or text upon the display 126.

Still with reference to the computer terminal 104 of the surveillance system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Figure 2:
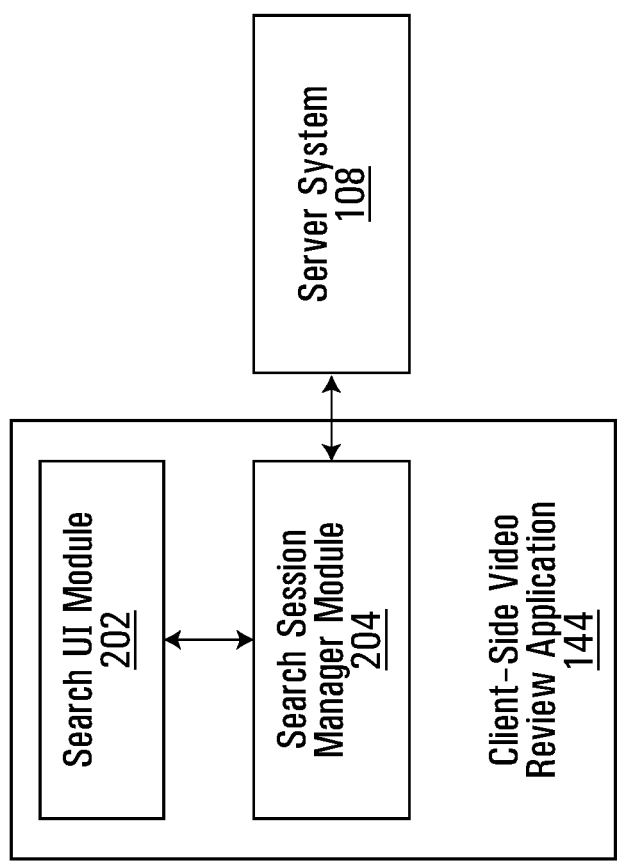
FIG. 2 shows a block diagram of a client-side video review application, in accordance with certain example embodiments, that can be provided within the example surveillance system of FIG. 1.

More details of the video review application 144 are shown in the block diagram of FIG. 2. The video review application 144 can be run on the computer terminal 104 and includes a search User Interface (UI) module 202 for cooperation with a search session manager module 204 in order to enable a computer terminal user to carry out actions related to providing input and, more specifically, input to facilitate identifying same individuals or objects appearing in a plurality of different video recordings. In such circumstances, the user of the computer terminal 104 is provided with a user interface generated on the display 126 through which the user inputs and receives information in relation the video recordings.

The video review application 144 also includes the search session manager module 204 mentioned above. The search session manager module 204 provides a communications interface between the search UI module 202 and a query manager module 164 (FIG. 1) of the server system 108. In at least some examples, the search session manager module 204 communicates with the query manager module 164 through the use of Remote Procedure Calls (RPCs).

Besides the query manager module 164, the server system 108 includes several software components for carrying out other functions of the server system 108. For example, the server system 108 includes a media server module 168. The media server module 168 handles client requests related to storage and retrieval of video taken by video cameras 169 in the surveillance system 100. The server system 108 also includes an analytics engine module 172. The analytics engine module 172 can, in some examples, be any suitable one of known commercially available software that carry out mathematical calculations (and other operations) to attempt computerized matching of same individuals or objects as between different portions of video recordings (or as between any reference image and video compared to the reference image). For example, the analytics engine module 172 can, in one specific example, be a software component of the Avigilon Control Center™ server software sold by Avigilon Corporation. In some examples the analytics engine module 172 can use the descriptive characteristics of the person's or object's appearance. Examples of these characteristics include the person's or object's shape, size, textures and color.

The server system 108 also includes a number of other software components 176. These other software components will vary depending on the requirements of the server system 108 within the overall system. As just one example, the other software components 176 might include special test and debugging software, or software to facilitate version updating of modules within the server system 108. The server system 108 also includes one or more data stores 190. In some examples, the data store 190 comprises one or more databases 191 which facilitate the organized storing of recorded video.

Regarding the video cameras 169, each of these includes a camera module 198. In some examples, the camera module 198 includes one or more specialized integrated circuit chips to facilitate processing and encoding of video before it is even received by the server system 108. For instance, the specialized integrated circuit chip may be a System-on-Chip (SoC) solution including both an encoder and a Central Processing Unit (CPU) and/or Vision Processing Unit (VPU). These permit the camera module 198 to carry out the processing and encoding functions. Also, in some examples, part of the processing functions of the camera module 198 includes creating metadata for recorded video. For instance, metadata may be generated relating to one or more foreground areas that the camera module 198 has detected, and the metadata may define the location and reference coordinates of the foreground visual object within the image frame. For example, the location metadata may be further used to generate a bounding box, typically rectangular in shape, outlining the detected foreground visual object. The image within the bounding box may be extracted for inclusion in metadata. The extracted image may alternately be smaller then what was in the bounding box or may be larger then what was in the bounding box. The size of the image being extracted can also be close to, but outside of, the actual boundaries of a detected object.

In some examples, the camera module 198 includes a number of submodules for video analytics such as, for instance, an object detection submodule, an instantaneous object classification submodule, a temporal object classification submodule and an object tracking submodule. Regarding the object detection submodule, such a submodule can be provided for detecting objects appearing in the field of view of the camera 169. The object detection submodule may employ any of various object detection methods understood by those skilled in the art such as, for example, motion detection and/or blob detection.

Regarding the object tracking submodule that may form part of the camera module 198, this may be operatively coupled to both the object detection submodule and the temporal object classification submodule. The object tracking submodule may be included for the purpose of temporally associating instances of an object detected by the object detection submodule. The object tracking submodule may also generate metadata corresponding to visual objects it tracks.

Regarding the instantaneous object classification submodule that may form part of the camera module 198, this may be operatively coupled to the object detection submodule and employed to determine a visual objects type (such as, for example, human, vehicle or animal) based upon a single instance of the object. The input to the instantaneous object classification submodule may optionally be a sub-region of an image in which the visual object of interest is located rather than the entire image frame.

Regarding the temporal object classification submodule that may form part of the camera module 198, this may be operatively coupled to the instantaneous object classification submodule and employed to maintain class information of an object over a period of time. The temporal object classification submodule may average the instantaneous class information of an object provided by the instantaneous classification submodule over a period of time during the lifetime of the object. In other words, the temporal object classification submodule may determine a type of an object based on its appearance in multiple frames. For example, gait analysis of the way a person walks can be useful to classify a person, or analysis of the legs of a person can be useful to classify a cyclist. The temporal object classification submodule may combine information regarding the trajectory of an object (e.g. whether the trajectory is smooth or chaotic, whether the object is moving or motionless) and confidence of the classifications made by the instantaneous object classification submodule averaged over multiple frames. For example, determined classification confidence values may be adjusted based on the smoothness of trajectory of the object. The temporal object classification submodule may assign an object to an unknown class until the visual object is classified by the instantaneous object classification submodule subsequent to a sufficient number of times and a predetermined number of statistics having been gathered. In classifying an object, the temporal object classification submodule may also take into account how long the object has been in the field of view. The temporal object classification submodule may make a final determination about the class of an object based on the information described above. The temporal object classification submodule may also use a hysteresis approach for changing the class of an object. More specifically, a threshold may be set for transitioning the classification of an object from unknown to a definite class, and that threshold may be larger than a threshold for the opposite transition (for example, from a human to unknown). The temporal object classification submodule may aggregate the classifications made by the instantaneous object classification submodule.

In some examples, the camera module 198 is able to detect humans and extract images of humans with respective bounding boxes outlining the human objects for inclusion in metadata which along with the associated video may transmitted to the server system 108. At the system 108, the media server module 168 can process extracted images and generate signatures (e.g. feature vectors) to represent objects. In computer vision, a feature descriptor is generally known as an algorithm that takes an image and outputs feature descriptions or feature vectors. Feature descriptors encode information, i.e. an image, into a series of numbers to act as a numerical "fingerprint" that can be used to differentiate one feature from another. Ideally this information is invariant under image transformation so that the features may be found again in another image of the same object. Examples of feature descriptor algorithms are SIFT (Scale-invariant feature transform), HOG (histogram of oriented gradients), and SURF (Speeded Up Robust Features).

In accordance with at least some examples, a feature vector is an n-dimensional vector of numerical features (numbers) that represent an image of an object processable by computers. By comparing the feature vector of a first image of one object with the feature vector of a second image, a computer implementable process may determine whether the first image and the second image are images of the same object.

Similarity calculation can be just an extension of the above. Specifically, by calculating the Euclidean distance between two feature vectors of two images captured by one or more of the cameras 169, a computer implementable process can determine a similarity score to indicate how similar the two images may be.

In some examples, the camera module 198 is able to detect humans and extract images of humans with respective bounding boxes outlining the human objects for inclusion in metadata which along with the associated video may transmitted to the server system 108. At the server system 108, the media server module 168 can process extracted images and generate signatures (e.g. feature vectors) to represent objects. In this example implementation, the media server module 168 uses a learning machine to process the bounding boxes to generate the feature vectors or signatures of the images of the objects captured in the video. The learning machine is for example a neural network such as a convolutional neural network (CNN) running on a graphics processing unit (GPU). The CNN may be trained using training datasets containing millions of pairs of similar and dissimilar images. The CNN, for example, is a Siamese network architecture trained with a contrastive loss function to train the neural networks. An example of a Siamese network is described in Bromley, Jane, et al. "Signature verification using a "Siamese" time delay neural network." International Journal of Pattern Recognition and Artificial Intelligence 7.04 (1993): 669-688.

The media server module 168 deploys a trained model in what is known as batch learning where all of the training is done before it is used in the appearance search system. The trained model, in this embodiment, is a CNN learning model with one possible set of parameters. There is, practically speaking, an infinite number of possible sets of parameters for a given learning model. Optimization methods (such as stochastic gradient descent), and numerical gradient computation methods (such as backpropagation) may be used to find the set of parameters that minimize the objective function (also known as a loss function). A contrastive loss function may be used as the objective function. A contrastive loss function is defined such that it takes high values when it the current trained model is less accurate (assigns high distance to similar pairs, or low distance to dissimilar pairs), and low values when the current trained model is more accurate (assigns low distance to similar pairs, and high distance to dissimilar pairs). The training process is thus reduced to a minimization problem. The process of finding the most accurate model is the training process, the resulting model with the set of parameters is the trained model, and the set of parameters is not changed once it is deployed onto the appearance search system.

In at least some alternative example embodiments, the media server module 168 may determine feature vectors by implementing a learning machine using what is known as online machine learning algorithms. The media server module 168 deploys the learning machine with an initial set of parameters; however, the appearance search system keeps updating the parameters of the model based on some source of truth (for example, user feedback in the selection of the images of the objects of interest). Such learning machines also include other types of neural networks as well as convolutional neural networks.

In accordance with at least some examples, storage of feature vectors within the surveillance system 100 is contemplated. For instance, feature vectors may are indexed and stored in the database 191 with respective video. The feature vectors may also be associated with reference coordinates to where extracted images of respective objects are located in respective video. Storing may include storing video with, for example, time stamps, camera identifications, metadata with the feature vectors and reference coordinates, etc.

Referring now to FIGS. 3 to 8B, there are shown various user interface pages that the search UI module 202 displays to a user of the client-side video review application 144, according to one example embodiment. The embodiment depicted in FIGS. 2 to 8B permits the application's 144 user to commence a search for a person-of-interest and to have a face thumbnail and a body thumbnail of the person-of-interest displayed to assist the user in identifying the person-of-interest while reviewing image search results. As used herein, a "person-of-interest" is a person that the application's 144 user is attempting to locate using the surveillance system 100; a "body thumbnail" of a person displays at least a portion of a torso of that person; and a "face thumbnail" of a person displays at least a portion of a face of that person. In the depicted example embodiments, the body thumbnail of a person displays that person's head and torso, while the face thumbnail of that person shows, as a proportion of the total area of the thumbnail, more of that person's face than is shown in the body thumbnail. The server system 108 in the embodiment of FIGS. 2 to 8B is able to search any one or more of a collection of video recordings using any one or more of the cameras 169 based on one or both of the person-of-interest's body and face; the collection of video recordings may or may not be generated concurrently by the cameras 169. Permitting the body and face to be used during searching accordingly may help both the server system 108 and the user identify the person-of-interest, particularly when the person-of-interest's body changes appearance in different recordings or at different times (e.g., resulting from the person-of-interest changing clothes).

Figure 3:
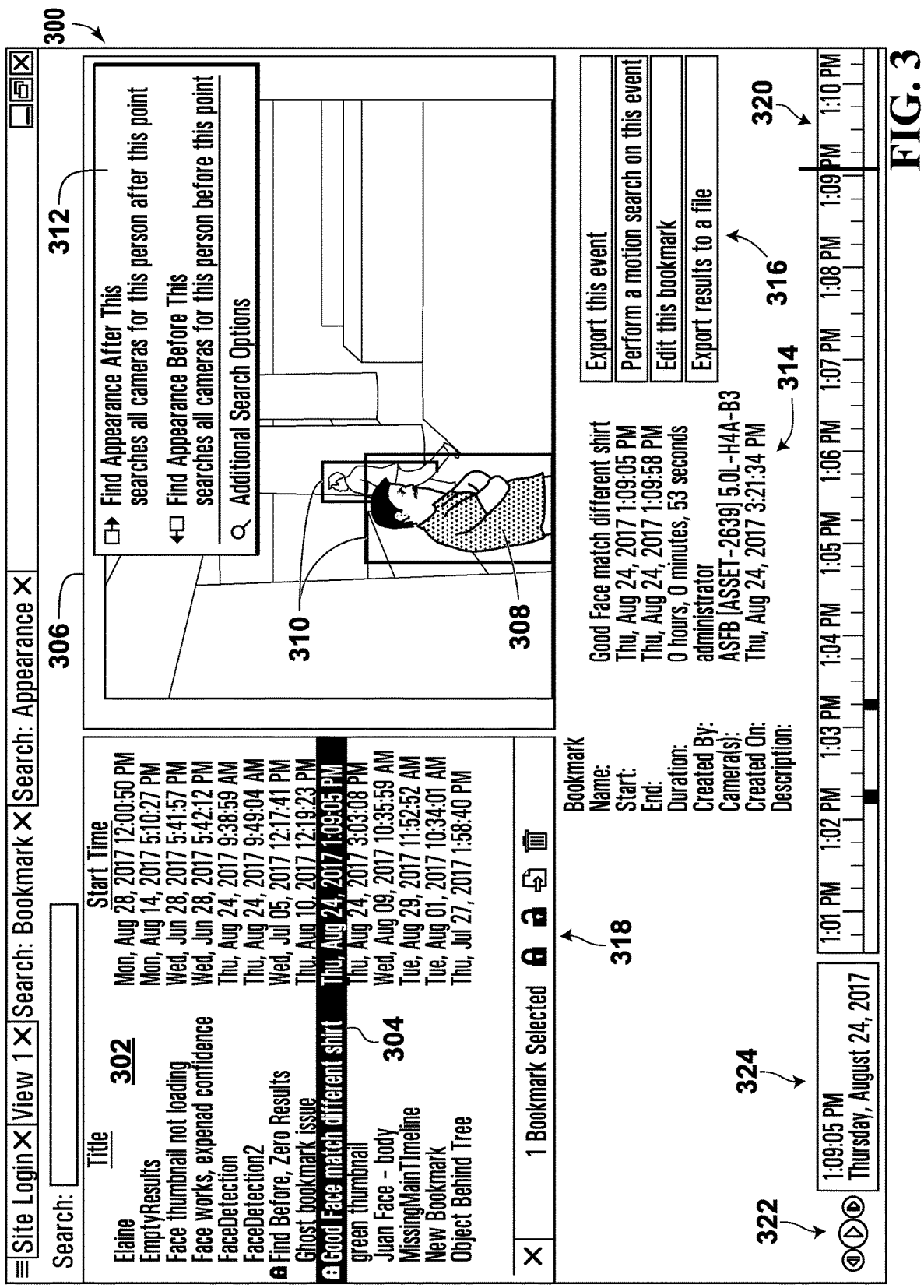
FIG. 3 shows a user interface page including an image frame of a video recording that permits a user to commence a search for a person-of-interest, according to an example embodiment implemented using the client-side video review application of FIG. 2.

Referring now to FIG. 3 in particular, there is shown a user interface page 300 including an image frame 306 of a selected video recording that permits a user of the application 144 to commence a search for a person-of-interest 308. The selected video recording shown in FIG. 3 is one of the collection of video recordings obtained using different cameras 169 to which the user has access via the application 144. The application 144 displays the page 300 on the terminal's 104 display 126. The user provides input to the application 144 via the input device 114, which in the example embodiment of FIG. 3 comprises a mouse or touch pad. In FIG. 3, displaying the image frame 306 comprises the application 144 displaying the image frame 306 as a still image, although in different embodiments displaying the image frame 306 may comprise playing the selected video recording or playing the selected video recording.

The image frame 306 of the selected video recording occupies the entirety of, and extends beyond, the top-right quadrant of the page 300. The frame 306 depicts a scene in which multiple persons are present. The server system 108 automatically identifies persons appearing in the scene that may be the subject of a search, and thus who are potential persons-of-interest 308 to the user, and highlights each of those persons by enclosing all or part of each in a bounding box 310. In FIG. 3, the user identifies the person located in the lowest bounding box 310 as the person-of-interest 308, and selects the bounding box 310 around that person to evoke a context menu 312 that may be used to commence a search. The context menu 312 presents the user with one option to search the collection of video recordings at all times after the image frame 306 for the person-of-interest 308, and another option to search the collection of video recordings at all times before the image frame 306. The user may select either of those options to have the server system 108 commence searching for the person-of-interest 308. The input the user provides to the server system 108 via the application 144 to commence a search for the person-of-interest is the "search commencement user input".

In FIG. 3, the user has bookmarked the image frame 306 according to which of the cameras 169 obtained it and its time index so as to permit the user to revisit that image frame 306 conveniently. Immediately below the image frame 306 is bookmark metadata 314 providing selected metadata for the selected video recording, such as its name and duration. To the right of the bookmark metadata 314 and below the image frame 306 are action buttons 316 that allow the user to perform certain actions on the selected video recording, such as to export the video recording and to perform a motion search on the recording.

Immediately to the left of the image frame 306 is a bookmark list 302 showing all of the user's bookmarks, with a selected bookmark 304 corresponding to the image frame 306. Immediately below the bookmark list 302 are bookmark options 318 permitting the user to perform actions such as to lock or unlock any one or more of the bookmarks to prevent them from being changed, to permit them to be changed, to export any one or more of the bookmarks, and to delete any one or more of the bookmarks.

Immediately below the bookmark options 318 and bordering a bottom-left edge of the page 300 are video control buttons 322 permitting the user to play, pause, fast forward, and rewind the selected video recording. Immediately to the right of the video control buttons 322 is a video time indicator 324, displaying the date and time corresponding to the image frame 306. Extending along a majority of the bottom edge of the page 300 is a timeline 320 permitting the user to scroll through the selected video recording and through the video collectively represented by the collection of video recordings. As discussed in further detail below in respect of FIGS. 8A and 8B, the timeline 320 is resizable in a manner that is coordinated with other features on the page 300 to facilitate searching.

Figure 4:
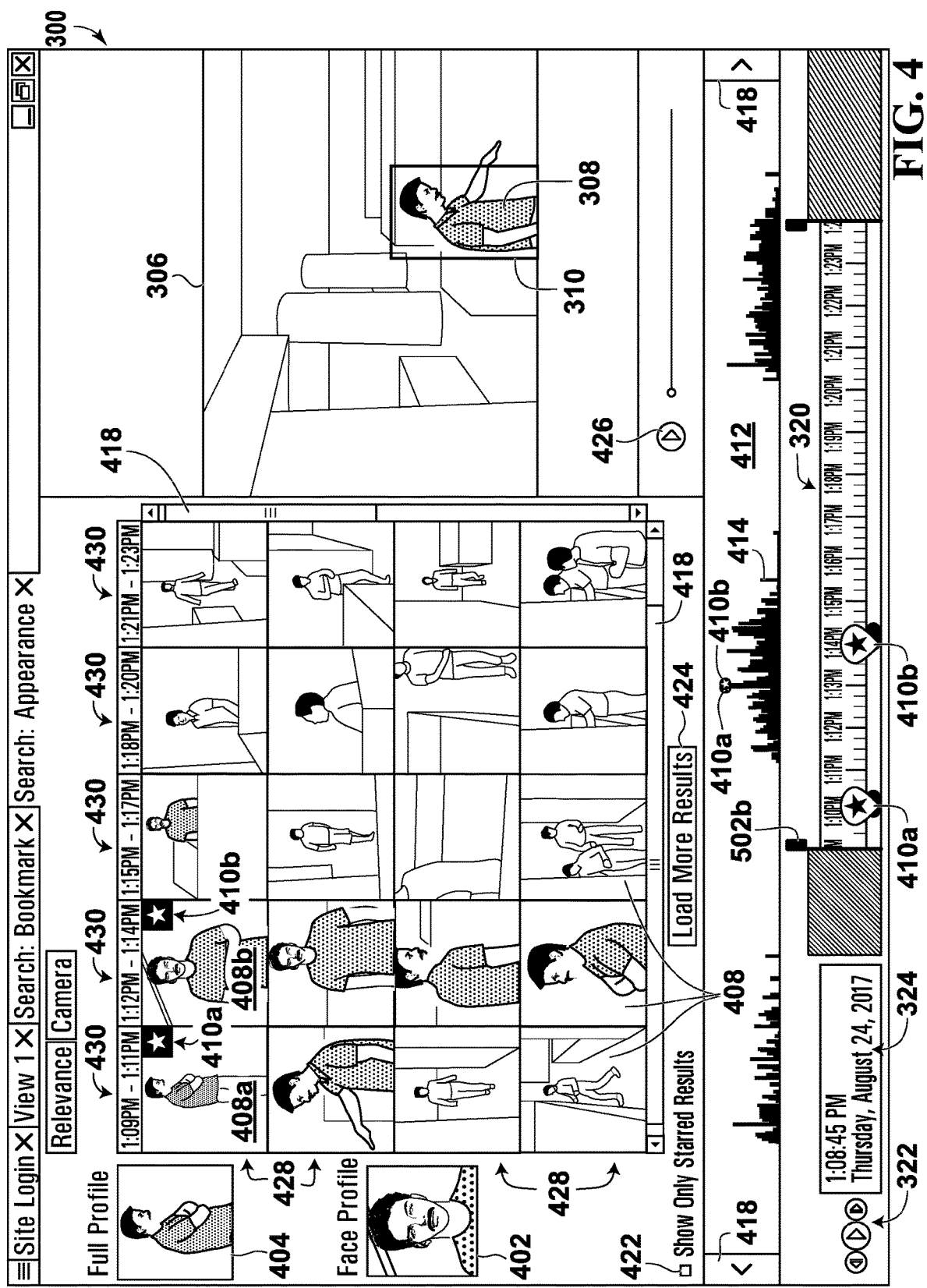
FIG. 4 shows a user interface page including image search results, a face thumbnail, and a body thumbnail of the person-of-interest, generated after a search for the person-of-interest has commenced and before a user has provided match confirmation user input, according to an example embodiment implemented using the client-side video review application of FIG. 2.

Referring now to FIG. 4, the user interface page 300 is shown after the server system 108 has completed a search for the person-of-interest 308. The page 300 concurrently displays the image frame 306 of the selected video recording the user used to commence the search bordering a right edge of the page 300; immediately to the left of the image frame 306, image search results 408 selected from the collection of video recordings by the server system 108 as potentially corresponding to the person-of-interest 108; and, immediately to the left of the image search results 408 and bordering a left edge of the page 300, a face thumbnail 402 and a body thumbnail 404 of the person-of-interest 308.

While video is being recorded, at least one of the cameras 169 and server system 108 in real-time identify when people, each of whom is a potential person-of-interest 308, are being recorded and, for those people, attempt to identify each of their faces. The server system 108 generates signatures based on the faces (when identified) and bodies of the people who are identified, as described above. The server system 108 stores information on whether faces were identified and the signatures as metadata together with the video recordings.

In response to the search commencement user input the user provides using the context menu 312 of FIG. 3, the server system 108 generates the image search results 408 by searching the collection of video recordings for the person-of-interest 308. The server system 108 performs a combined search including a body search and a face search on the collection of video recordings using the metadata recorded for the person-of-interest's 308 body and face, respectively. More specifically, the server system 108 compares the body and face signatures of the person-of-interest 308 the user indicates he or she wishes to perform a search on to the body and face signatures, respectively, for the other people the system 108 has identified. The server system 108 returns the search results 408, which includes a combination of the results of the body and face searches, which the application 144 uses to generate the page 300. Any suitable method may be used to perform the body and face searches; for example, the server system 108 may use a convolutional neural network when performing the body search.

In one example embodiment, the face search is done by searching the collection of video recordings for faces. Once a face is identified, the coordinates of a bounding box that bounds the face (e.g., in terms of an (x,y) coordinate identifying one corner of the box and width and height of the box) and an estimation of the head pose (e.g., in terms of yaw, pitch, and roll) are generated. For example, for each face, any one or more of distance between the corners of eyes, distance between the centers of eyes, nose width, depth of eye sockets, shape of cheekbones, shape of jaw line, shape of chin, hair color, and the presence and color of facial hair may be used as metrics. Once the feature vectors are generated for the faces, the Euclidean distance between vectors for different faces may be determined and used to assess face similarity. As another example, a feature vector may be generated by the media server module 168 as discussed above.

In at least one example embodiment, the cameras 169 generate the metadata and associated feature vectors in or nearly in real-time, and the server system 108 subsequently assesses face similarity using those feature vectors. However, in at least one alternative example embodiment the functionality performed by the cameras 169 and server system 108 may be different. For example, functionality may be divided between the server system 108 and cameras 169 in a manner different than as described above. Alternatively, one of the server system 108 and the cameras 169 may generate the feature vectors and assess face similarity.

In FIG. 4, the application 144 uses as the body thumbnail 404 at least a portion of the image frame 306 that is contained within the bounding box 310 highlighting the person-of-interest. The application 144 uses as the face thumbnail 402 at least a portion of one of the face search results that satisfy a minimum likelihood that that result correspond to the person-of-interest's 308 face; in one example embodiment, the face thumbnail 402 is drawn from the result of the face search that is most likely to correspond to the person-of-interest's 308 face. Additionally or alternatively, the result used as the basis for the face thumbnail 402 is one of the body search results that satisfies a minimum likelihood that the result correspond to the person-of-interest's 308 body. In another example embodiment, the face thumbnail 402 may be selected as at least a portion of the image frame 306 that is contained within the bounding box 310 highlighting the person-of-interest 308 in FIG. 4.

In FIG. 4, the image search results 408 comprise multiple images arranged in an array comprising n rows 428 and m columns 430, with n=1 corresponding to the array's topmost row 428 and m=1 corresponding to the array's leftmost column 430. The results 408 are positioned in a window along the right and bottom edges of which extend scroll bars 418 that permit the user to scroll through the array. In FIG. 4, the array comprises at least 4×5 images, as that is the portion of the array that is visible without any scrolling using the scroll bars 418.

Each of the columns 430 of the image search results 408 corresponds to a different time period of the collection of video recordings. In the example of FIG. 4, each of the columns 430 corresponds to a three minute duration, with the leftmost column 430 representing search results 408 from 1:09 p.m. to 1:11 p.m., inclusively, the rightmost column 430 representing search results 408 from 1:21 p.m. to 1:23 p.m., inclusively, and the middle three columns 430 representing search results 408 from 1:12 p.m. to 1:20 p.m., inclusively. Additionally, in FIG. 4 each of the image search results 408 is positioned on the display 126 according to a likelihood that the image search result 408 corresponds to the person-of-interest 308. In the embodiment of FIG. 4, the application 144 implements this functionality by making the height of the image search result 408 in the array proportional to the likelihood that image search result 408 corresponds to the person-of-interest 308. Accordingly, for each of the columns 430, the search result 408 located in the topmost row 428 (n=1) is the result 408 for the time period corresponding to that column 430 that is most likely to correspond to the person-of-interest 308, with match likelihood decreasing as n increases.

In the depicted embodiment, all of the search results 408 satisfy a minimum likelihood that they correspond to the person-of-interest 308; for example, in certain embodiments the application 144 only displays search results 408 that have at least a 25% likelihood ("match likelihood threshold") of corresponding to the person-of-interest 308. However, in certain other embodiments, the application 144 may display all search results 408 without taking into account a match likelihood threshold, or may use a non-zero match likelihood threshold that is other than 25%.

In FIG. 4, the body and face thumbnails 404,402 include at least a portion of a first image 408a and a second image 408b, respectively, which include part of the image search results 408. The first and second images 408a,b, and accordingly the body and face thumbnails 404,402, are different in FIG. 4; however, in different embodiments (not depicted), the thumbnails 404,402 may be based on the same image. Overlaid on the first and second images 408a,b are a first and a second indicator 410a,b, respectively, indicating that the first and second images are the bases for the body and face thumbnails 404,402. In FIG. 4 the first and second indicators 410a,b are identical stars, although in different embodiments (not depicted) the indicators 410a,b may be different.

Located immediately below the image frame 306 of the selected video recording are playback controls 426 that allow the user to play and pause the selected video recording. Located immediately below the horizontal scroll bar 418 beneath the image search results 408 is a load more results button 424, which permits the user to prompt the application 144 for additional search results 408. For example, in one embodiment, the application 144 may initially deliver at most a certain number of results 408 even if additional results 408 exceed the match likelihood threshold. In that example, the user may request another tranche of results 408 that exceed the match likelihood threshold by selecting the load more results button 424. In certain other embodiments, the application 144 may be configured to display additional results 408 in response to the user's selecting the button 424 even if those additional results 408 are below the match likelihood threshold.

Located below the thumbnails 402,404 is a filter toggle 422 that permits the user to restrict the image search results 408 to those that the user has confirmed corresponds to the person-of-interest 308 by having provided match confirmation user input to the application 144, as discussed further below.

Spanning the width of the page 300 and located below the thumbnails 402,404, search results 408, and image frame 306 is an appearance likelihood plot for the person-of-interest 308 in the form of a bar graph 412. The bar graph 412 depicts the likelihood that the person-of-interest 308 appears in the collection of video recordings over a given time span. In FIG. 4, the time span is divided into time periods of one day, and the entire time span is approximately three days (from August 23-25, inclusive). Each of the time periods is further divided into discrete time intervals, each of which is represented by one bar 414 of the bar graph 412. As discussed in further detail below, any one or more of the time span, time periods, and time intervals are adjustable in certain embodiments. The bar graph 412 is bookmarked at its ends by bar graph scroll controls 418, which allow the user to scroll forward and backward in time along the bar graph 412.

To determine the bar graph 412, the server system 108 determines, for each of the time intervals, a likelihood that the person-of-interest 308 appears in the collection of video recordings for the time interval, and then represents that likelihood as the height of the bar 414 for that time interval. In this example embodiment, the server system 108 determines that likelihood as a maximum likelihood that the person-of-interest 308 appears in any one of the collection of video recordings for that time interval. In different embodiments, that likelihood may be determined differently. For example, in one different embodiment the server system 108 determines that likelihood as an average likelihood that the person-of-interest 308 appears in the image search results 408 that satisfy the match likelihood threshold.

In FIG. 4, the first and second indicators 410a,b that the application 144 displays on the image search results 408 are also displayed on the bar graph 412 on the bars 414 that correspond to the time intervals during which the first and second images 408a,b are captured by the cameras 169, and on the timeline 320 at positions corresponding to those time intervals. This permits the user of the application 144 to quickly identify not only the images 408a,b used as the bases for the thumbnails 402,404, but to be visually presented in three different ways information on when those images 408a,b were captured. This may be particularly useful when neither the first image 408a nor second image 408b is currently shown on the display 126 (e.g., they may include part of the image search results 408 but require that the user scroll in order to see them) and therefore the indicators 410a,b are visible only on one or both of the bar graph 412 and timeline 320.

While in the depicted embodiment the appearance likelihood plot is shown as comprising the bar graph 412, in different embodiments (not depicted) the plot may take different forms. For example, the plot in different embodiments may include a line graph, with different points on the line graph corresponding to appearance likelihood at different time intervals, or use different colors to indicate different appearance likelihoods.

As in FIG. 3, the page 300 of FIG. 4 also includes the timeline 320, video control buttons 322, and video time indicator 324 extending along the bottom of the page 300.

The application 144 permits the user to provide match confirmation user input regarding whether at least one of the image search results 408 depicts the person-of-interest 308. The user may provide the match confirmation user input by, for example, selecting one of the image search results 408 to bring up a context menu (not shown) allowing the user to confirm whether that search result 408 depicts the person-of-interest 308. In response to the match confirmation user input, the server system 108 in the depicted embodiment determines whether any match likelihoods change and, accordingly, whether positioning of the image search results 408 is to be changed in response to the match confirmation user input. For example, in one embodiment when the user confirms one of the results 408 is a match, the server system 108 may use that confirmed image as a reference for comparisons when performing one or both of face and body searches. When the positioning of the image search results is to be changed, the application 144 updates the positioning of the image search results 408 in response to the match confirmation user input. For example, the application 144 may delete from the image search results 408 any result the user indicates does not contain the person-of-interest 308 and rearrange the remaining results 408 accordingly. In one example embodiment, one or both of the face and body thumbnails 402,404 may change in response to the match confirmation user input. In another example embodiment, if the server system 108 is initially unable to identify any faces of the person-of-interest 308 and the application 144 accordingly does not display the face thumbnail 402, the server system 108 may be able to identify the person-of-interest's 308 face after receiving match confirmation user input and the application 144 may then show the face thumbnail 402.

Figure 5:
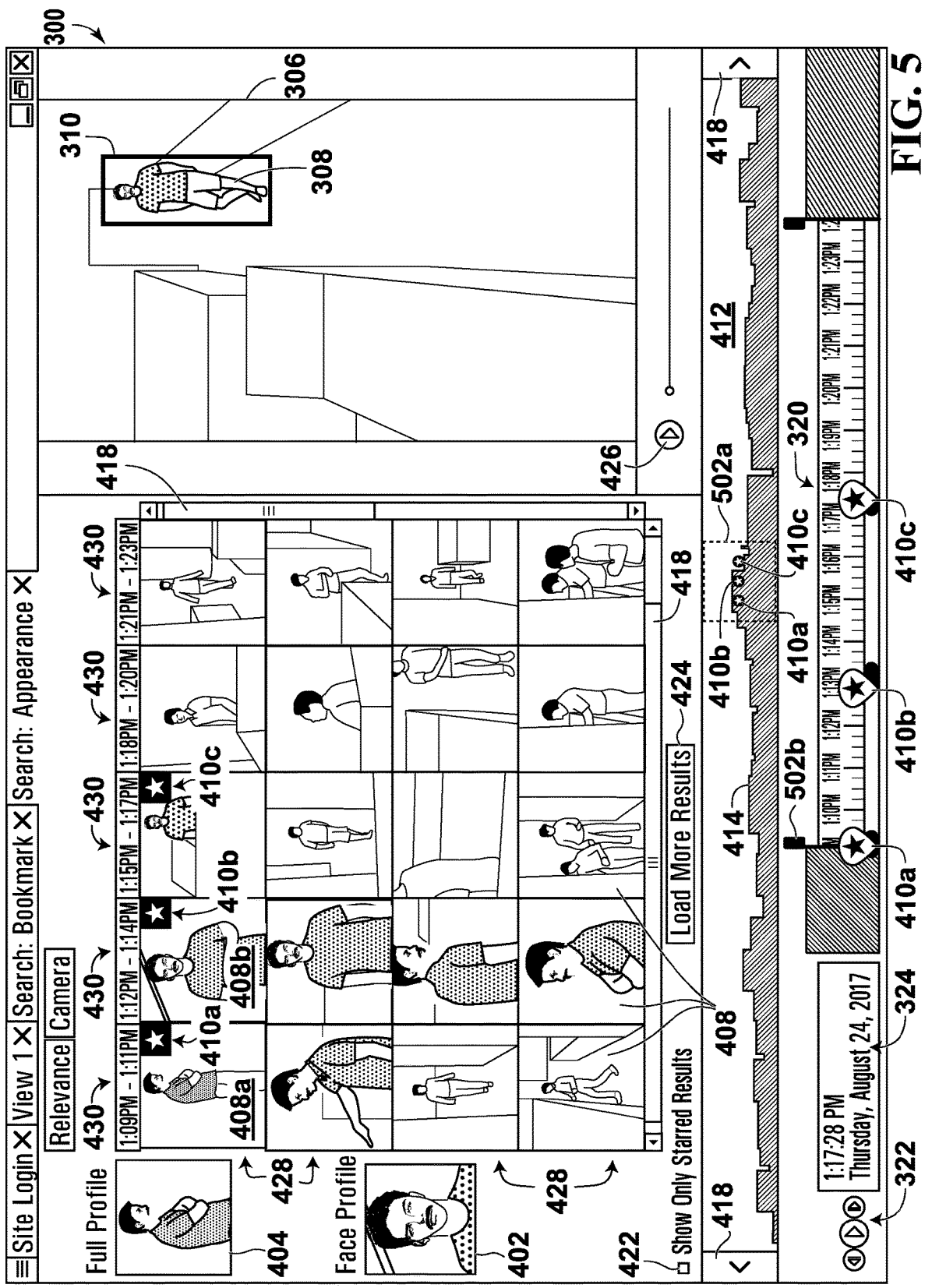
FIG. 5 shows a user interface page including image search results, a face thumbnail, and a body thumbnail of the person-of-interest, generated after a user has provided match confirmation user input, according to an example embodiment implemented using the client-side video review application of FIG. 2.

When the match confirmation user input indicates that any one of the selected image search results 408 depicts the person-of-interest 308, the application 144 displays a third indicator 410c over each of the selected image results 408 that the user confirms corresponds to the person-of-interest 308. As shown in the user interface page 300 of FIG. 5, which represents the page 300 of FIG. 4 after the user has provided match confirmation user input, the third indicator 410c in the depicted embodiment is a star and is identical the first and second indicators 410a,b. All three indicators 410a-c in FIG. 5 are in the three leftmost columns and the first row of the array of search results 408. In different embodiments (not depicted), any one or more of the first through third indicators 410a-c may be different from each other.

The page 300 of FIG. 5 also shows an appearance likelihood plot resizable selection window 502a and a timeline resizable selection window 502b overlaid on the bar graph 412 and the timeline 320, respectively. The user, by using the input device 114, is able to change the width of and pan each of the windows 502a,b by providing window resizing user input. As discussed in further detail below in respect of FIGS. 8A and 8B, the selection windows 502a,b are synchronized such that resizing one of the windows 502a,b such that it covers a particular time span automatically causes the application 144 to resize the other of the windows 502a,b so that it also covers the same time span. Additionally, the application 144 selects the image search results 408 only from the collection of video recordings corresponding to the particular time span that the selection windows 502a,b cover. In this way, the user may reposition one of the selection windows 502a,b and automatically have the application 144 resize the other of the selection windows 502a,b and update the search results 408 accordingly.

Figure 8A:
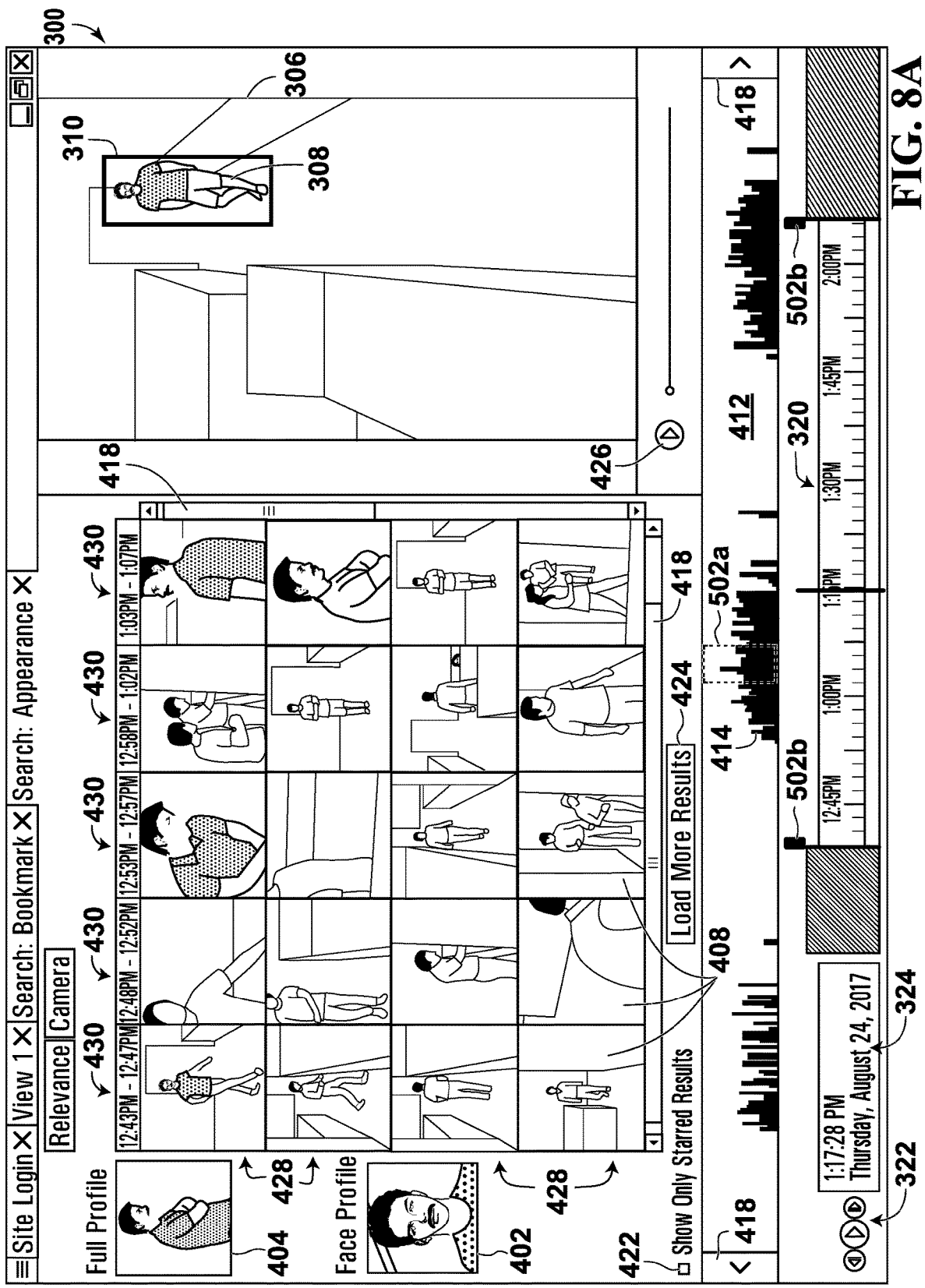
FIGS. 8A and 8B show a user interface page including image search results, a face thumbnail, and a body thumbnail of the person-of-interest in which a resizable window placed over a bar graph representing appearance likelihood is used to select image search results over a first duration (FIG. 8A) and a second, longer duration (FIG. 8B), according to an example embodiment implemented using the client-side video review application of FIG. 2.
Figure 8B:
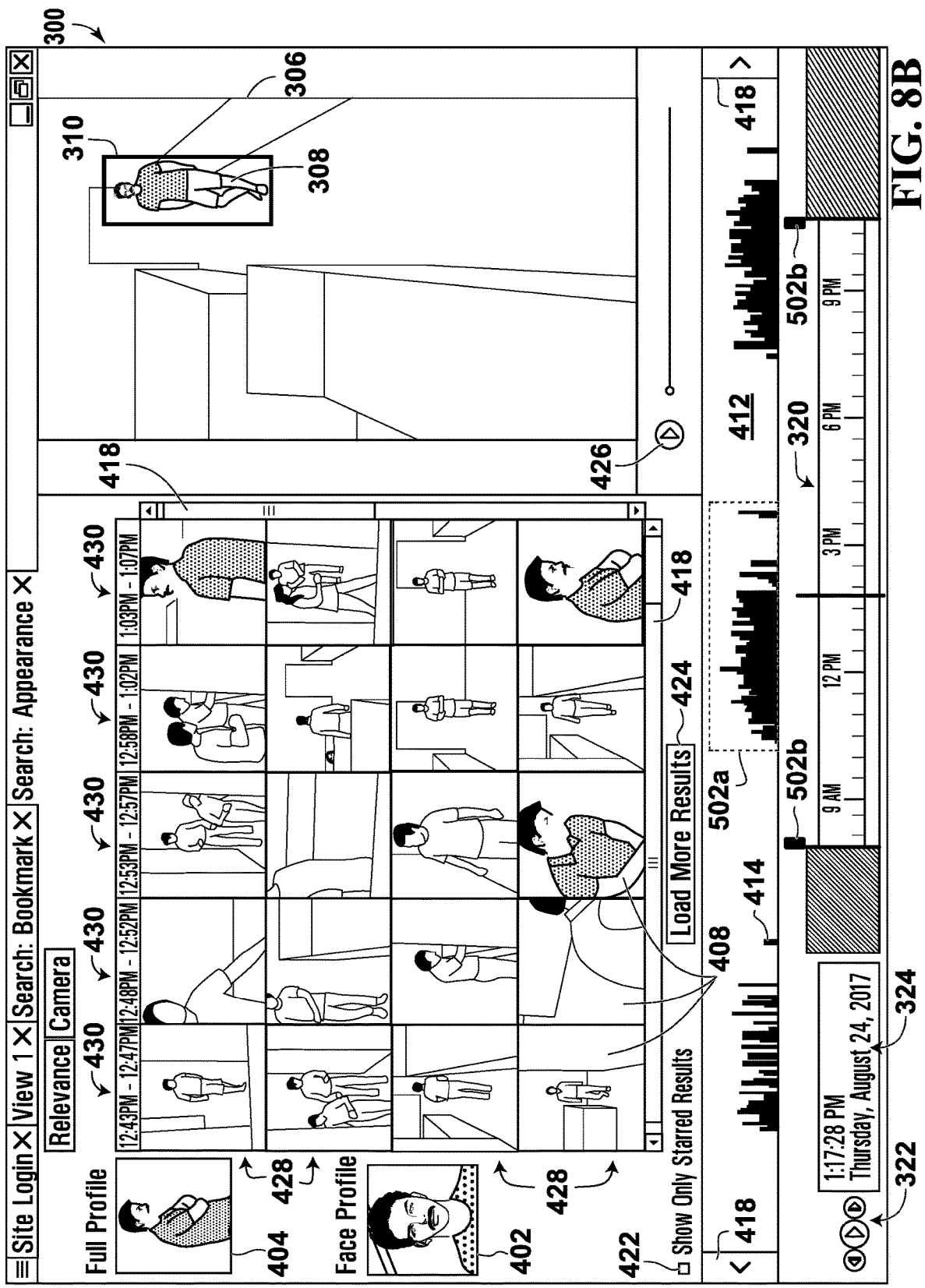

In FIGS. 8A and 8B, the user interface page 300 of FIG. 3 is shown with the resizable selection windows 502a,b selected to span a first duration (FIG. 8A, in which only a portion of the search results 408 for August $24^{th}$ is selected) and a second, longer duration (FIG. 8B, in which substantially all of the search results 408 for August $24^{th}$ is selected). As described above, the windows 502a,b in each of FIGS. 8A and 8B represent the same duration of time because the application 144, in response to the user resizing one of the windows 502a,b, automatically resizes the other. Additionally, the array of search results 408 the application 144 displays differs depending on the duration selected by the windows 502a,b, since the duration affects the portion of the collection of video recordings that may be used as a basis for the search results 408.

Figure 6:
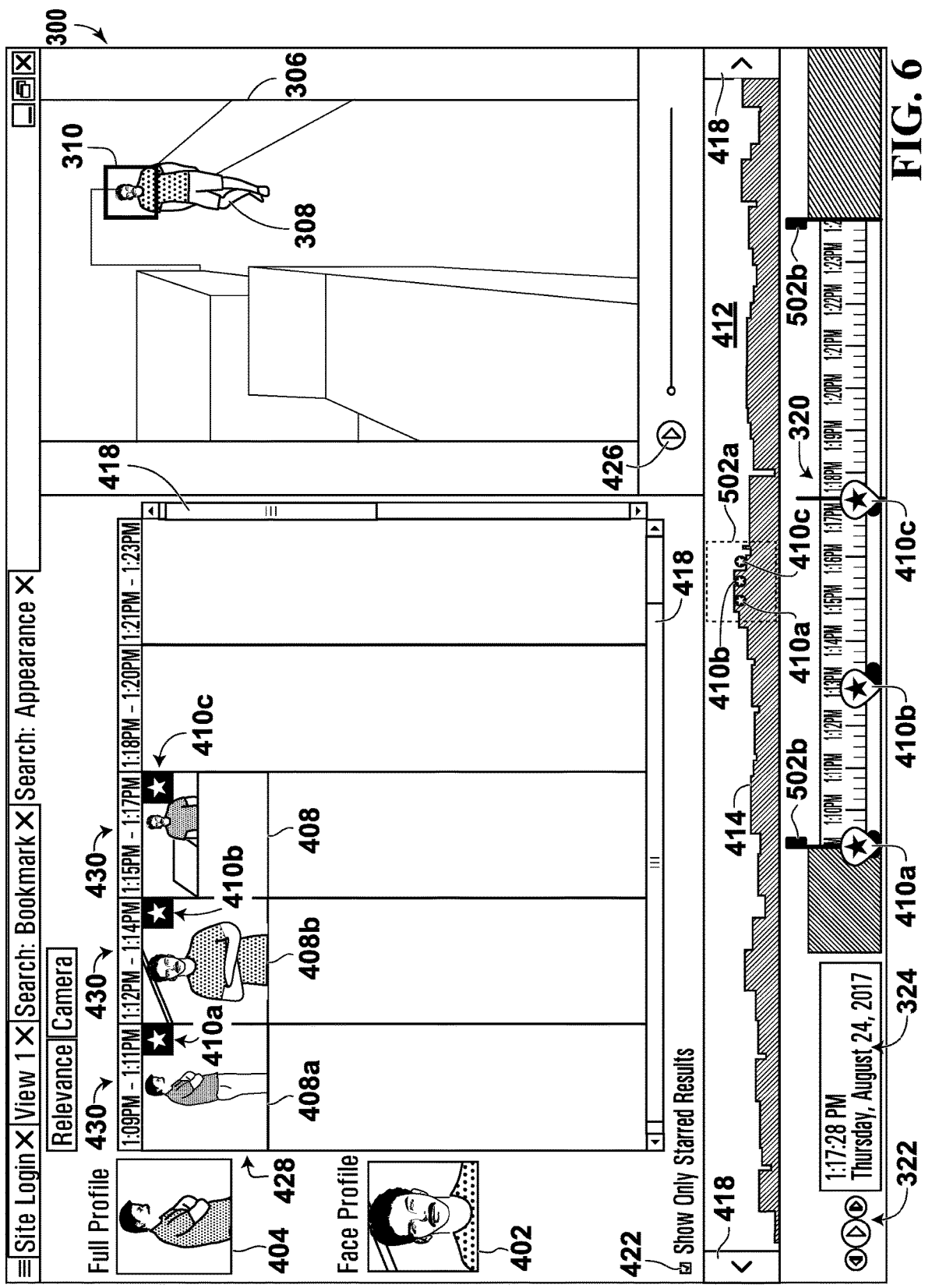
FIG. 6 shows a user interface page including image search results, a face thumbnail, and a body thumbnail of the person-of-interest, with the image search results limited to those a user has indicated show the person-of-interest, according to an example embodiment implemented using the client-side video review application of FIG. 2.

Referring now to FIG. 6, there is shown the user interface page 300 of FIG. 5 after the user has toggled the filter toggle 422 to limit the displayed search results 408 to those that the user has either provided match confirmation user input confirming that those results 408 display the person-of-interest 308 and to those that are used as the bases for the face and body thumbnails 402,404. As mentioned above, the indicators 410a-c used to highlight the search results 408 in the array is also used to highlight in the bar graph 412 and the timeline 320 when those results 408 were obtained.

Figure 7:
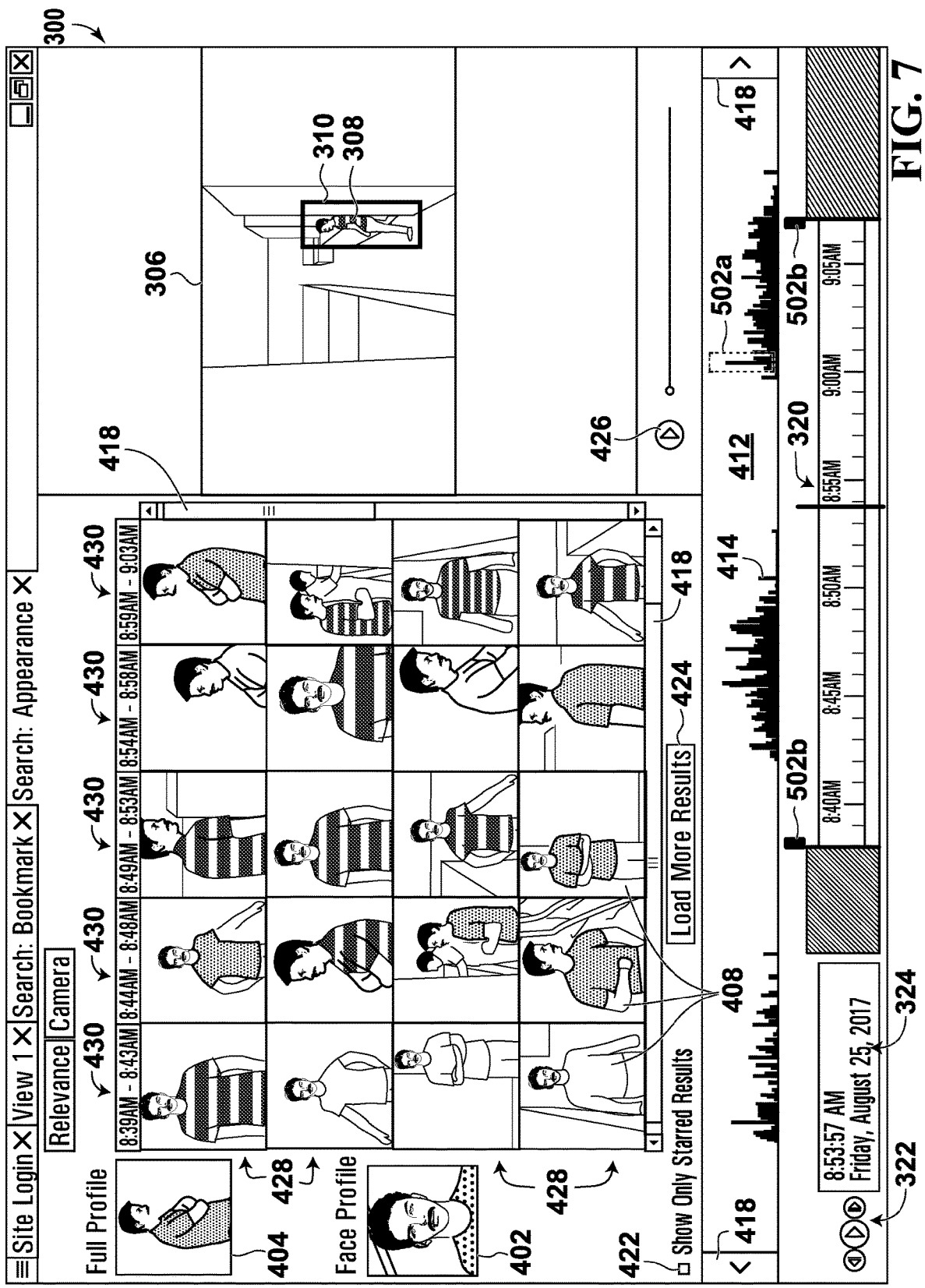
FIG. 7 shows a user interface page including image search results, a face thumbnail, and a body thumbnail of the person-of-interest, with the image search results showing the person-of-interest wearing different clothes than in FIGS. 3-6, according to an example embodiment implemented using the client-side video review application of FIG. 2.

FIG. 7 shows a user interface page including the image search results 408, the face thumbnail 402, and the body thumbnail 404 of the person-of-interest 308, with the image search results 408 showing the person-of-interest 308 wearing different clothes than in FIGS. 3-6. In FIG. 7, the selection windows 502*a,b* have been adjusted so that the image search results are limited to images from August 25th, while the search results 408 depicted in FIGS. 3-6 are limited to images from August 24th. As mentioned above, the server system 108 in the depicted embodiment searches the collection of video recordings for the person-of-interest 308 using both face and body searches, with the body search taking into account the person-of-interest's 308 clothing. Incorporating the face search accordingly helps the server system 108 identify the person-of-interest 308, particularly when his or her clothing is different at different times within one or more of the collection of video recordings or is different across different recordings comprising the collection of video recordings. Because the person-of-interest 308 in the results of FIG. 7 is wearing different clothing than in FIGS. 3-6 and the appearance of his body has accordingly changed, the person-of-interest 308 shown in the image search results 408 of FIG. 7 (such as in the results 408 in which the person-of-interest 308 is wearing a striped shirt) is accordingly identified primarily using the face search as opposed to the body search.

Figure 9:
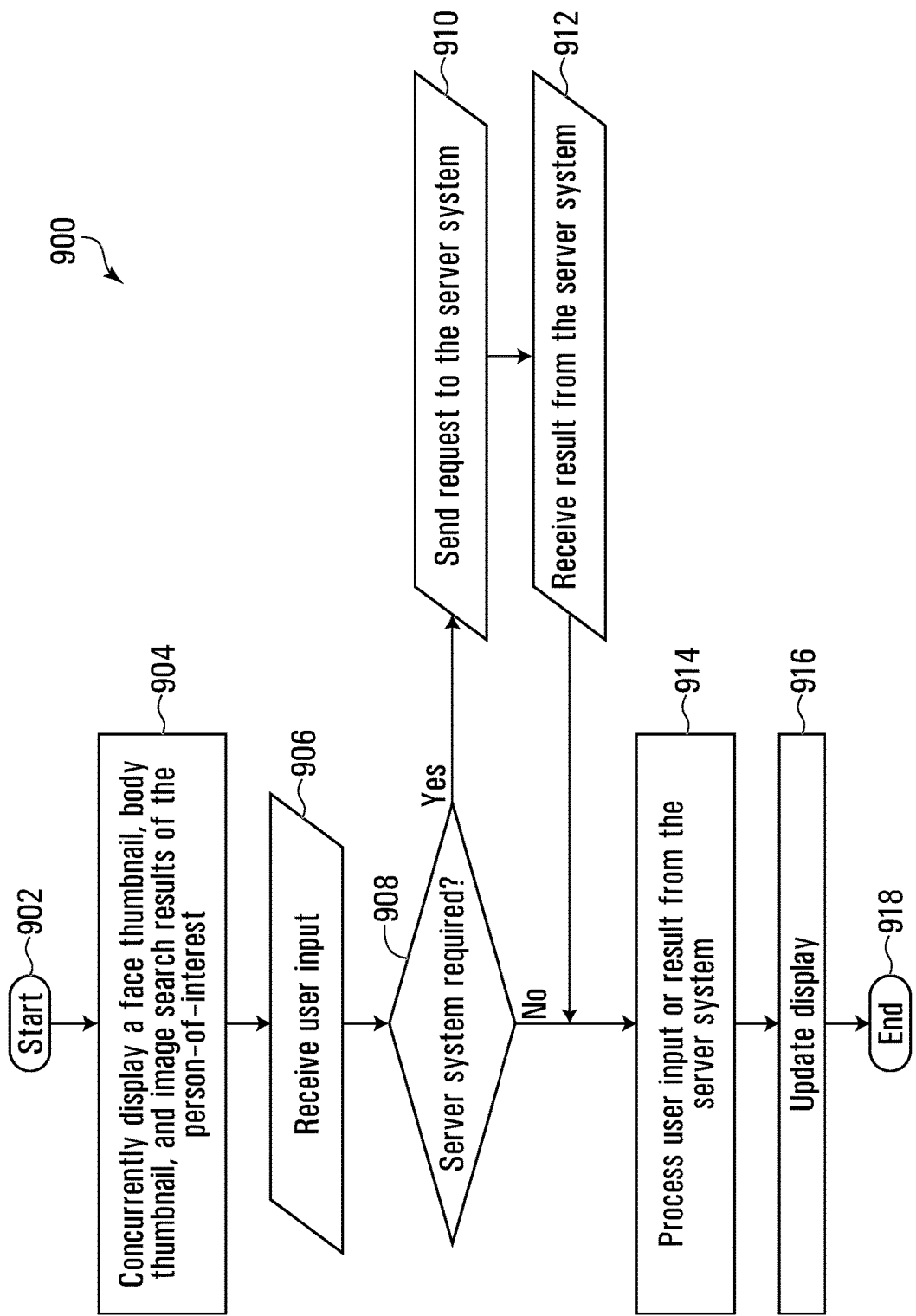
FIG. 9 shows a method for interfacing with a user to facilitate an image search for a person-of-interest, according to another example embodiment.

Referring now to FIG. 9, there is shown a method 900 for interfacing with the user to facilitate an image search for the person-of-interest 308, according to another example embodiment. The method 900 may be expressed as computer program code that implements the application 144 and that is stored in the terminal's 104 non-volatile storage 120. At runtime, the processor 112 loads the computer program code into the RAM 116 and executes the code, thereby performing the method 900.

The method 900 starts at block 902, following which the processor 112 proceeds to block 904 and concurrently displays, on the display 126, the face thumbnail 402, body thumbnail 404, and the image search results 408 of the person-of-interest 308.

The processor 112 proceeds to block 906 where it receives some form of user input; example forms of user input are the match confirmation user input and search commencement user input described above. Additionally or alternatively, the user input may comprise another type of user input, such as any one or more of interaction with the playback controls 426, the bar graph 412, and the timeline 320.

Following receiving the user input, the processor proceeds to block 908 where it determines whether the server system 108 is required to process the user input received at block 906. For example, if the user input is scrolling through the image results 408 using the scroll bars 418, then the server system 108 is not required and the processor 112 proceeds directly to block 914 where it processes the user input itself. When processing input in the form of scrolling, the processor 112 determines how to update the array of image results 408 in response to the scrolling and then proceeds to block 916 where it actually updates the display 126 accordingly.

In certain examples, the processor 112 determines that the server system 108 is required to properly process the user input. For example, the user input may include search commencement user input, which results in the server system 108 commencing a new search of the collection of video recordings for the person-of-interest 308. In that example, the processor 112 proceeds to block 910 where it sends a request to the server system 108 to process the search commencement user input in the form, for example, of a remote procedure call. At block 912 the processor 112 receives the result from the server system 108, which may include an updated array of image search results 408 and associated images.

The processor 112 subsequently proceeds to block 914 where it determines how to update the display 126 in view of the updated search results 408 and images received from the server system 108 at block 912, and subsequently proceeds to block 916 to actually update the display 126.

Regardless of whether the processor 112 relies on the server system 108 to perform any operations at blocks 910 and 912, a reference herein to the processor 112 or application 144 performing an operation includes an operation that the processor 112 or application 144 performs with assistance from the server system 108, and an operation that the processor 112 or application 144 performs without assistance from the server system 108.

After completing block 916, regardless of whether the processor 112 communicated with the server system 108 in response to the user input, the processor 112 proceeds to block 918 where the method 900 ends. The processor 112 may repeat the method 900 as desired, such as by starting the method 900 again at block 902 or at block 906.

Facet Search

In at least some example embodiments, the methods, systems, and techniques as described herein are adapted as described further below to search for an object-of-interest. An object-of-interest may comprise the person-of-interest 308 described above in respect of FIGS. 3 to 8B; additionally or alternatively, an object-of-interest may comprise a non-person object, such as a vehicle. More particularly, the server system 108 in at least some example embodiments is configured to perform a "facet search", where a "facet" is a data structure describing a particular visual characteristic of an object-of-interest. The system 108 in at least some example embodiments saves the facet data structure in storage 190 as comprising a "descriptor" and a "tag". The facet descriptor may comprise a text string describing the type of facet, while the facet tag may comprise a value indicating the nature of that facet. For example, when the facet is hair color, the facet descriptor may be "hair color" and the facet tag may be "brown" or another color drawn from a list of colors. Similarly, when the facet is a type of clothing, the facet descriptor may be "clothing type" and the facet tag may be "jacket" or another clothing type drawn from a list of clothing types. In at least some example embodiments, a reference to a "facet" is accordingly a reference to a descriptor:tag pair. In at least some example embodiments when the object-of-interest is a vehicle, facet descriptors may be color, make, model, or configuration.

When the system 108 is being used to search for a person-of-interest, "descriptors" of that person-of-interest may comprise, for example, any one or more of that person's gender, that person's age, a type of clothing being worn by that person, a color of that clothing, a pattern displayed on that clothing, that person's hair color, that person's hair length, that person's footwear color, and that person's clothing accessories (such as, for example, a purse or bag).

In at least some example embodiments and as described in respect of FIGS. 10A to 11E, the server system 108 is configured to permit a facet search to be done before or after an image search of the type described in respect of FIGS. 3 to 8B. In contrast to the "facet search" workflow depicted in FIGS. 10A to 11E, the image search described in respect of FIGS. 3 to 8B is hereinafter described as "body/face search", as it is performed based on the person-of-interest's 308 body or face.

Figure 10A:
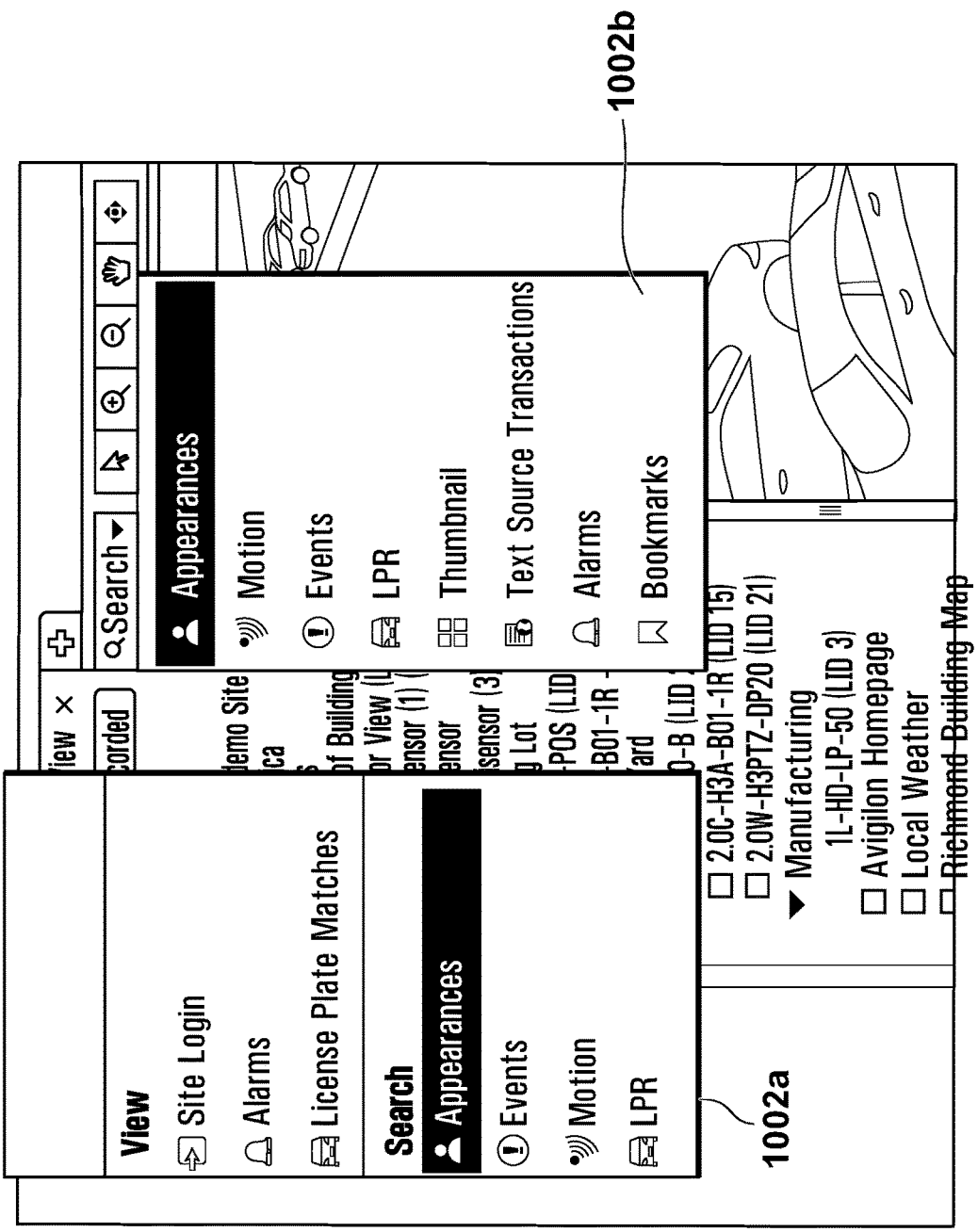

Referring now to FIGS. 10A-10E, there are depicted the user interface page 300 or portions thereof in various states while a facet search is being performed, according to at least one example embodiment. In FIG. 10A, the page 300 comprises a first search menu 1002a and a second search menu 1002b, either of which a user may interact with to commence a facet search. The first search menu 1002a is an example of a context menu while the second menu 1002b is an example of a drop-down menu. The user may commence a facet search by selecting the "Appearances" option on either of the menus 1002a,b.

After selecting "Appearances" in FIG. 10A, the user interface displays a facet search menu 1004 as shown in FIG. 10B. The menu 1004 comprises an object-of-interest selector 1008, which in FIG. 10B are radio buttons allowing the user to select an object-of-interest in the form of a person (as selected in FIG. 10B) or a vehicle; various tag selectors in the form of a gender selector 1016, an age selector 1018 and various additional tag selectors 1010; a date range selector 1012, which allows the user to limit the facet search to a specified date range; a camera selector 1014, which allows the user to limit the facet search to particular, specified cameras; and a search button 1006 that, when selected by the user, comprises facet search commencement user input indicating that the facet search is to commence. In at least one different example embodiment, such as that depicted in FIGS. 12A and 12B, the menu 1004 may graphically depict user-selectable images of different hairstyles, upper and lower body clothing types, and different colors to permit the user to select facet descriptors and/or tags. For example, in FIG. 12A the user may select tags for descriptors such as gender, age, hair style, and/or hair color; and in FIG. 12B, the user may select tags for descriptors such as upper body clothing type and color; lower body clothing type and color; and footwear color.

The tag selectors 1010,1016,1018 allow the user to adjust any one or more of the person-of-interest's 308 gender (selected in FIG. 10A to be male); age (not specified in FIG. 10A); clothing type (selected in FIG. 10A to comprise jeans and a T-shirt); clothing color and/or pattern (selected in FIG. 10A to be red); hair color (not specified in FIG. 10A); footwear color (not specified in FIG. 10A); and accessories (not specified in FIG. 10A) such as, for example, whether the person-of-interest 308 is holding a purse or wearing a hat. In different example embodiments (not depicted), more, fewer, or different facets than those listed in FIG. 10A may be selectable.

Figure 10C:
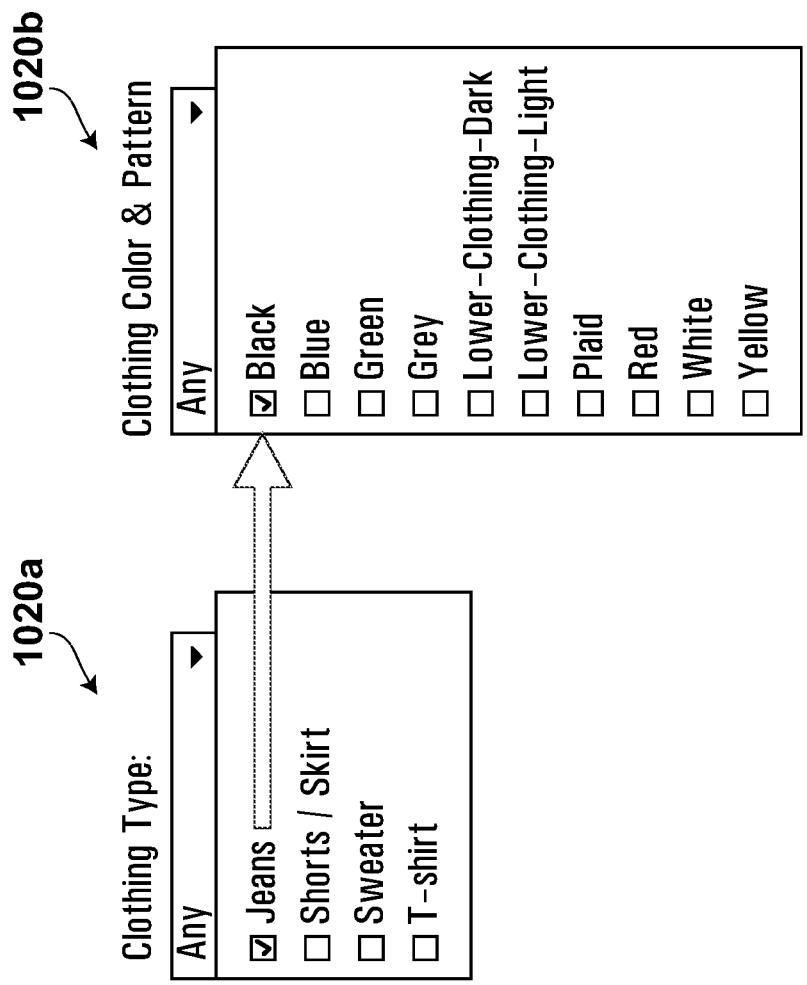

FIG. 10C depicts an example clothing type menu 1020a and an example clothing color and/or pattern menu 1020b, which are depicted as example additional tag selectors 1010 in FIG. 10B. The clothing type menu 1020a allows the user to select any one or more of jeans, shorts/skirt, a sweater, and a T-shirt as facets, and the clothing color and/or pattern menu 1020b allows the user to select any one or more of black, blue, green, grey, dark (lower clothing), light (lower clothing), plaid, red, white, and yellow facets as applied to the person-of-interest's 308 clothing. In at least some example embodiments, the lower clothing selectors of the color and/or pattern menu 1020b are only user selectable if the user has also selected lower body clothing in the clothing type menu 1020a. As shown in FIG. 10C, as the user has selected "jeans" in the clothing type menu 1020a, the user is then free to specify whether the jeans are light or dark in the color and/or pattern menu 1020b. In at least some different example embodiments, a user may select the facet tag (e.g., clothing's color and/or pattern) regardless of whether the facet descriptor has been selected. In the depicted example embodiment, the facet descriptor is "clothing type", while the "facet tag" comprises the various colors and types in the drop-down menus 1020a,b.

In at least some different example embodiments (not depicted), the user interface may differ from that which is depicted. For example, instead of the text-based drop-down menus 1020a,b depicted in FIGS. 10B and 10C, the UI module 202 may present the user with an array of user-selectable images representing the facets available to be searched, analogous to those displayed in FIGS. 12A and 12B. Additionally or alternatively, in at least some example embodiments the clothing type menu 1020a comprises at least one of "Upper Body Clothing" and "Lower Body Clothing", with a corresponding at least one of "Upper Body Clothing Color" and "Lower Body Clothing Color" being depicted in the clothing color and/or pattern menu 1020.

In response to the facet search commencement user input that the user provides by selecting the search button 1006, the system 108 searches one or more of the video recordings for the facets. The system 108 may perform the searching using a suitably trained artificial neural network, such as a convolutional neural network as described above for the body/face search. The system 108 displays, on the display, facet image search results depicting the facets, with the facet image search results being selected from the one or more video recordings that were searched. In at least the depicted example embodiment, the facet image search results depict the facet in conjunction with a type of object-of-interest common to the image search results. As mentioned above, a neural network such as a convolutional neural network may be used to generate the search results 408. In at least some example embodiments, the neural network outputs as the results 408 not only the facets themselves, but a confidence level for each of those facets. The system 108 may compare the confidence level for each facet against the match likelihood threshold and only display those results that exceed the match likelihood threshold. If the system 108 is searching for multiple facets (e.g., gender:male [first facet] and clothing type:T-shirt [second facet]), then the system 108 determines an overall score for a search result by summing the confidence level of each of the facets, and in at least some embodiments may only display a result if the overall score exceeds the match likelihood threshold. For example, if a facet search is done for gender:male and clothing type:T-shirt and one of the images in the search results 408 returns a match confidence level of 85% for each of the facets, that image is ranked higher than a competing image that returns a match confidence level of 85% for one of the facets and 75% for the other.

Figure 10D:
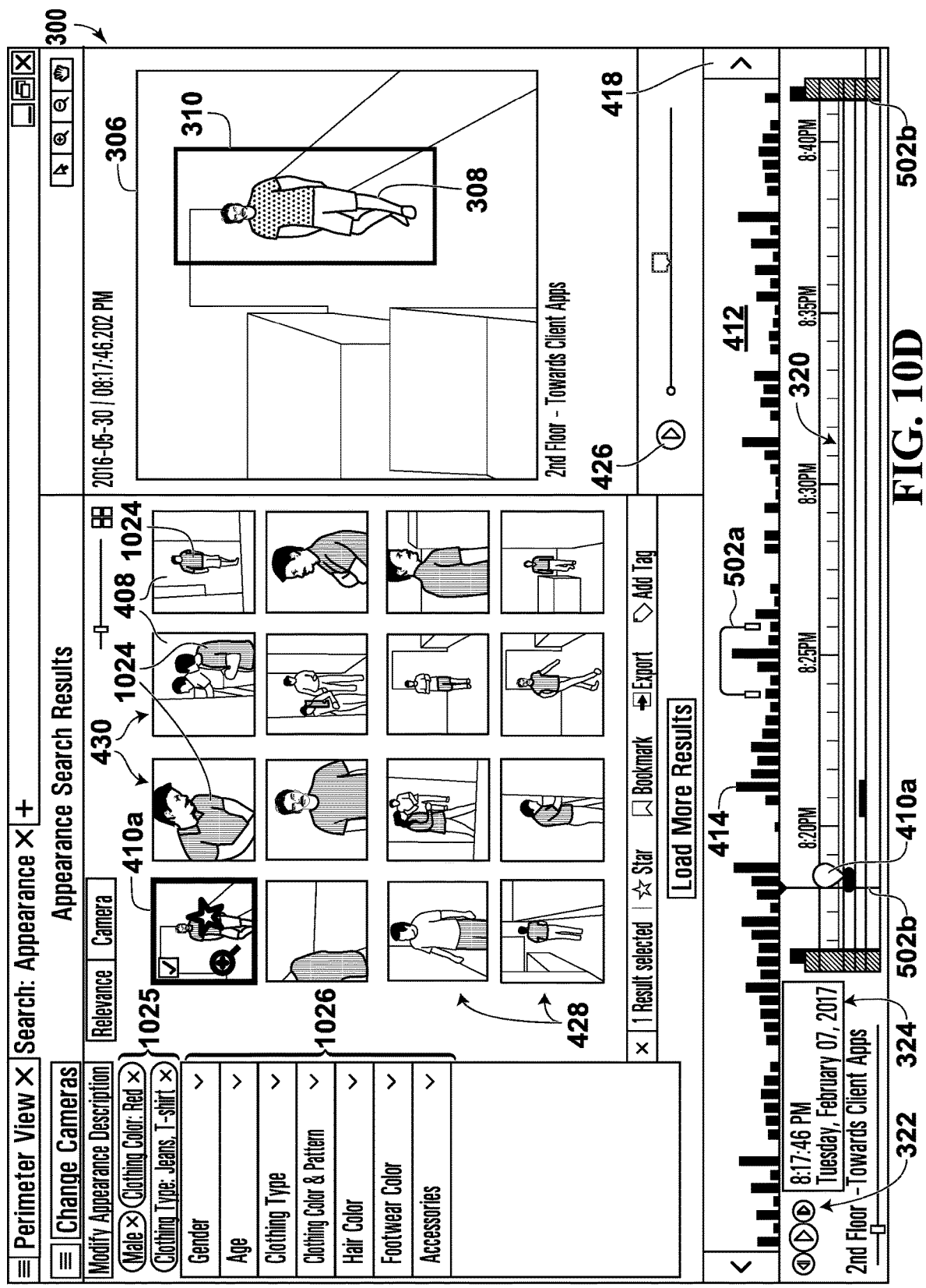

FIG. 10D shows a page 300 depicting the facet image search results using an interface that is analogous to that depicted in FIGS. 4-8B. Similar to the body/face search described above, the image search results 408 comprising the results are arranged in an array comprising n rows 428 and m columns 430, with images 408 that are more likely to depict the facets shown in higher columns than image search results 408 that are less likely to depict the facets. In contrast to the embodiments of FIGS. 4-8B, the different columns 430 into which the facet image search results are arranged do not correspond to different time periods; instead, the results in each row 428 of the results are ordered by confidence from left (higher confidence) to right (lower confidence). In FIG. 10D, the system 108 searched for a person-of-interest in the form of a man wearing jeans and a T-shirt 1024, with the T-shirt 1024 being red, as summarized in a searched facets list 1025 and as specified by the user in the menu 1004 depicted in FIG. 10B.

Each of the entries in the searched facet list 1025 displays an "X" that is user selectable, and that when selected by the user causes that entry in the list 1025 to disappear. Removing a facet from the list 1025 in this manner represents updated facet search commencement user input, and causes the system 108 to update the facet image search results by searching for the updated list of facets. The results of this updated search are displayed in the n×m array of image search results 408. In at least some example embodiments, the act of removing a facet from the list 1025 in this manner is implemented by the system 108 deleting the contents of a tag associated with the removed facet.

Figures 13A, 13B:
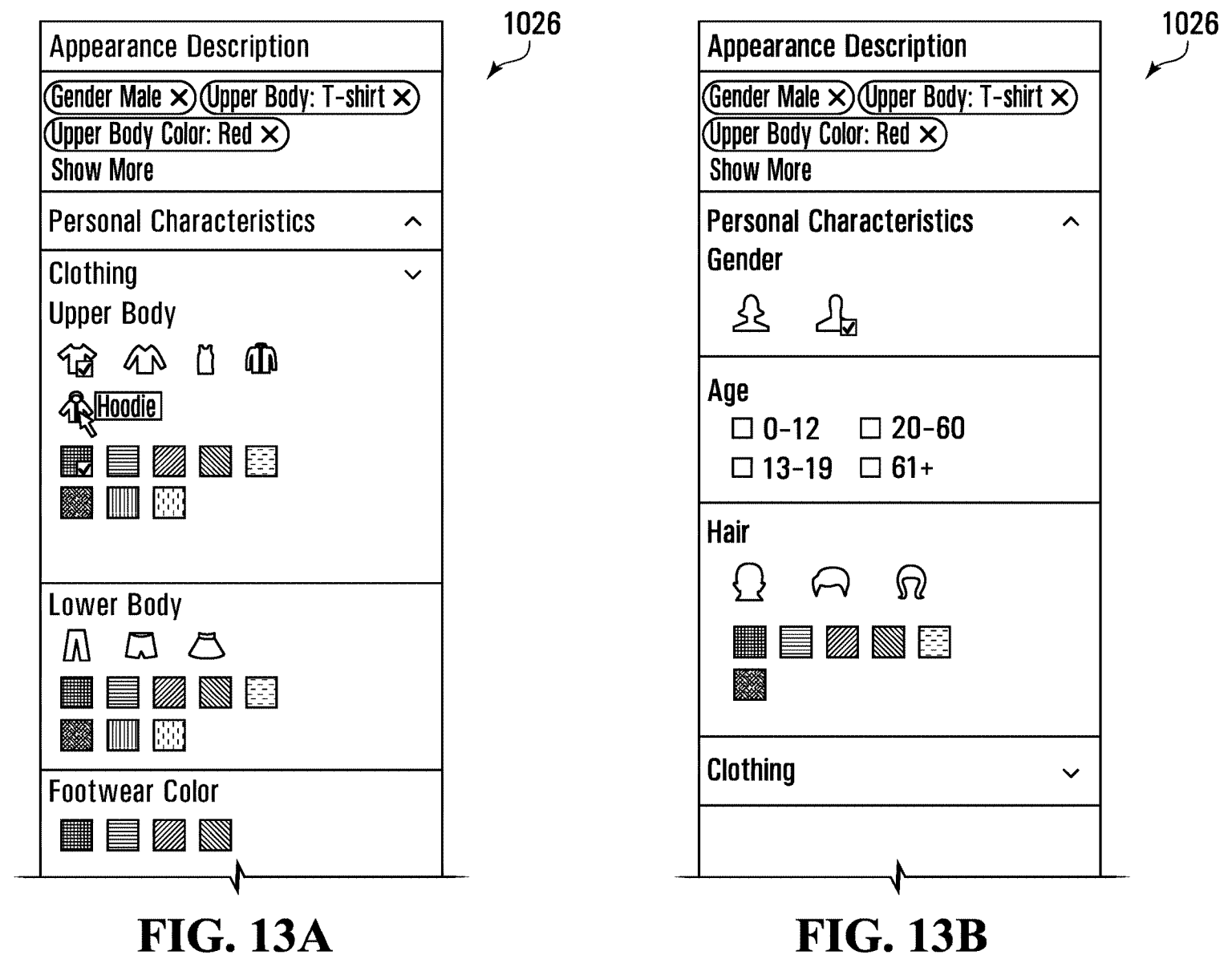

Below the searched facet list 1025 is a series of menus 1026, identified by facet descriptors, allowing the user to further revise the facet tags to be searched by adding or removing tags in a manner analogous to that described in respect of the menu 1004 of FIG. 10B. Adding or removing tags in this manner is also an example of updated facet search commencement user input, and accordingly also causes the system 108 to update the facet image search results by searching for facets having the updated tags. While the menus 1026 of FIG. 10D comprise drop-down menus, in at least some different example embodiments, such as that depicted in FIGS. 13A and 13B, various user-selectable images depicting possible tags are presented to the user instead of drop-down menus.

The user may commence a body/face search directly from the page 300 of FIG. 10D. In FIG. 10D, the user may select the person-of-interest 308 who will be the subject of the body/face search, which in this case is in the first image 410a, and through a context menu (not shown in FIG. 10D) directly commence the body/face search for the person-of-interest 308. In this example, the system's 108 receiving a signal from the user to commence the search through the context menu is an example of object-of-interest search commencement user input.

In response to that object-of-interest search commencement user input, the system 108 searches the one or more video recordings for the object-of-interest. In at least some example embodiments, the search is not restricted to the one or more video recordings from which were selected the facet image search results; for example, the system 108 may search the same video recordings that were searched when performing the facet search. In at least some other example embodiments, the one or more video recordings that are searched are the one or more video recordings from which the facet image search results were selected, and the object-of-interest search results are selected from those one or more video recordings. After the system 108 performs the object-of-interest search, it displays, on the display, the object-of-interest search results. In at least some of those example embodiments in which the object-of-interest search is done on the video recordings that were also searched when performing the facet search, the object-of-interest search results depict the object-of-interest and the facet. The object-of-interest search results are depicted in the user interface page 300 of FIG. 10E, which is analogous to the pages 300 depicted in FIGS. 4-8B.

Figure 10E:
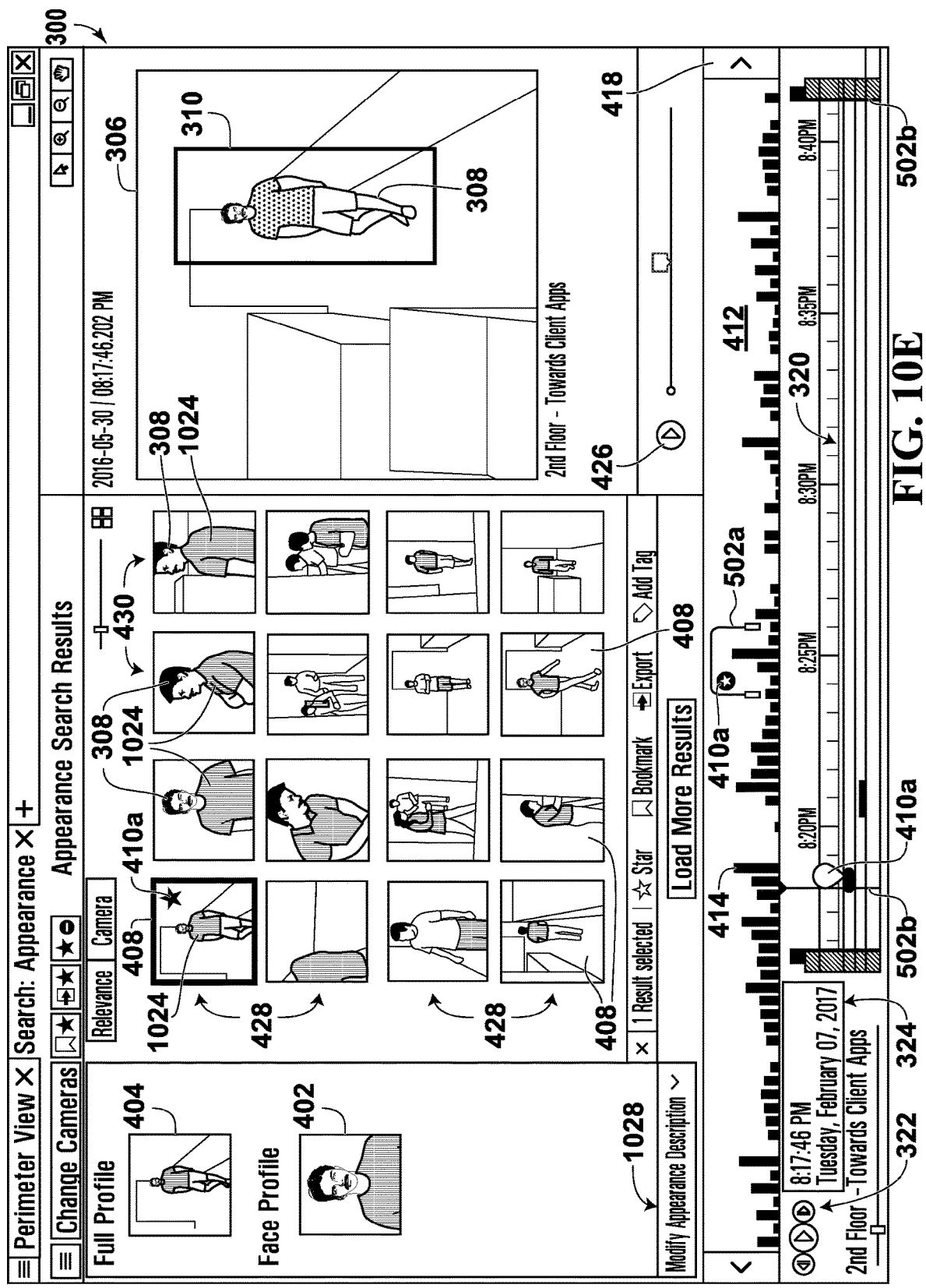

FIG. 10E also depicts a facet modification element 1028 that, when selected, brings up the facet list 1025 and menus 1026 of FIG. 10D to permit the user to modify and re-run the facet search, if desired. In at least some example embodiments, in response to a user's selecting the facet modification element 1028, the list 1025 and menus 1026 are brought up with showing the facet tags on which the depicted facet search results are based.

The object-of-interest search described immediately above is done after one or more facet searches. In at least some example embodiments, the object-of-interest search may be done before a facet search is done. For example, a body/face search may be done, and those image search results displayed, in accordance with the embodiments of FIGS. 4-8B. In at least some example embodiments, the system 108 identifies facets appearing in those image search results, and displays, on the display, a list of those facets. The user then selects a facet from the list of facets, which represents facet search commencement user input. The system 108 then searches the one or more video recordings from which are selected the object-of-interest search results for the facet, and subsequently displays facet search results that show the object-of-interest in conjunction with the facet.

Figure 11A:
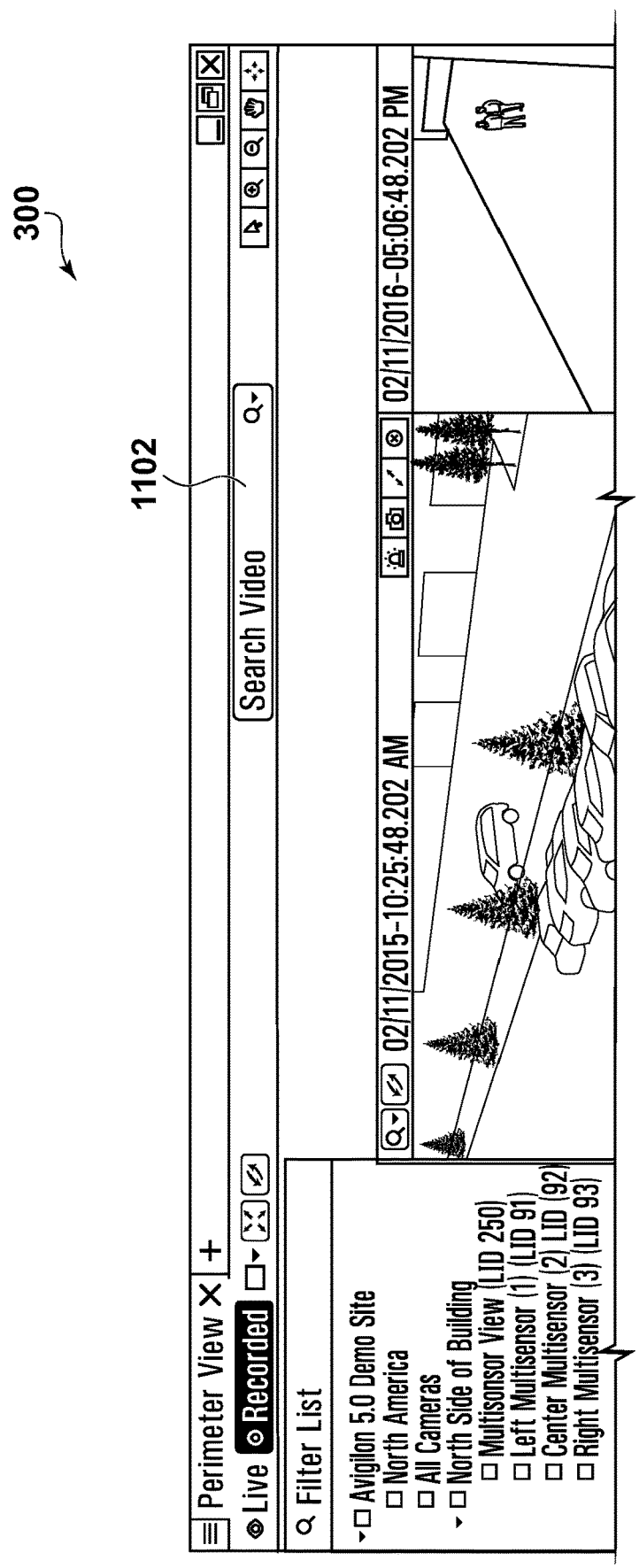

Referring now to FIGS. 11A-11E, there are depicted the user interface page 300 or portions thereof in various states when a natural language facet search is being performed, according to another example embodiment. FIG. 11A depicts the page 300 comprising a natural language search box 1102 configured to receive a natural language text query from the user. The user may input the query using input devices such as a keyboard and/or a dictation tool. In at least some example embodiments, the natural language search processing engine may use any one or more of a context-free grammar parse tree, a dependency grammar parser, a probabilistic parser, and word embedding.

Figure 11B:
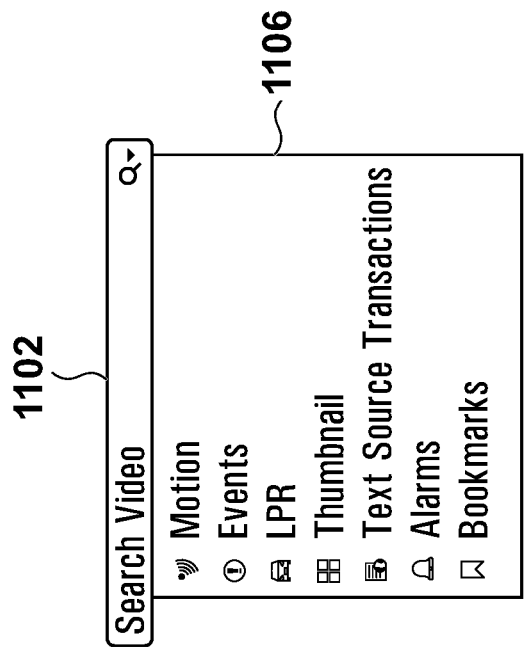

FIG. 11B shows a text box 1104 listing example natural language search queries that the system 108 can process. One example query is "Elderly woman wearing a white sweater between 10-11 am today", in which the object-of-interest is a person, and the facets are her age (elderly), her gender (woman), her type of clothing (a sweater), and her clothing's color (white). Another example query is "Man with brown hair wearing a red shirt around [00:00] today", in which the object-of-interest is again a person, and the facets are his hair color (brown), his type of clothing (a shirt), and his clothing's color (red). The system 108 further constrains the search with non-facet limitations, which in these two examples comprise time and date of the video recordings to be searched. FIG. 11D similarly depicts an example natural language search query for a, "Man with a mustache wearing a red shirt 8-9 pm tod[ay]". In this example, the object-of-interest is a person, and the facets are his facial hair (mustache), his type of clothing (shirt), and his color of clothing (red), with additional search constraints of time and date.

Figure 11C:
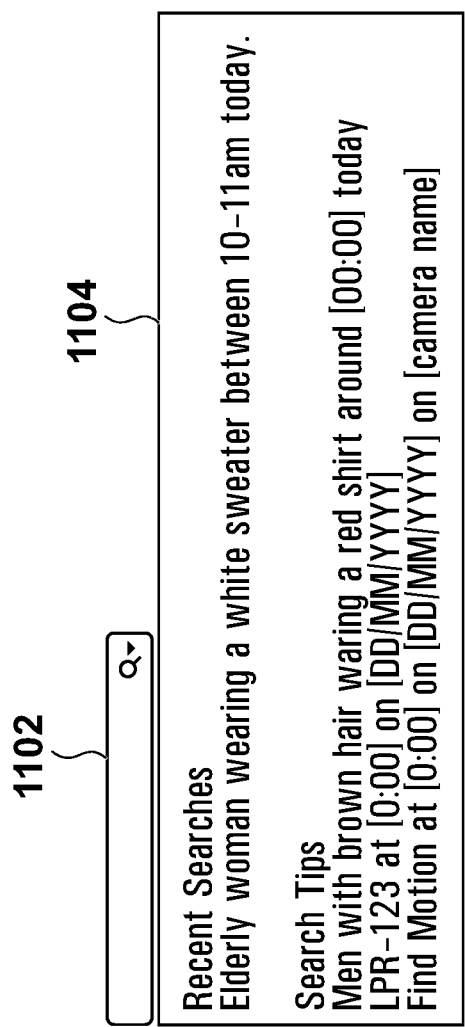
Figure 11D:
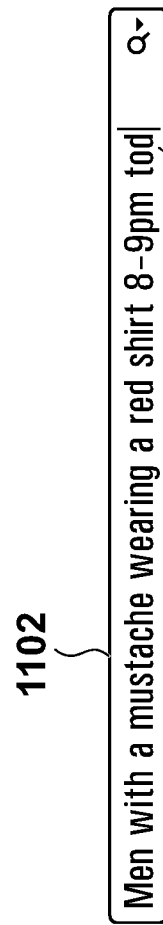

FIG. 11C depicts various data collections 1106 that may be searched in response to a natural language search query. In addition to video, the system 108 may search any one or more of motion, events, license plates, image thumbnails, text, alarms, and bookmarks.

In at least some example embodiments, the system 108 performs a facet search immediately after receiving queries of the type depicted in FIGS. 11B-11D. In at least some different example embodiments, the system 108 first displays the facet search menu 1004 of FIG. 11E to the user in order to confirm the data the system 108 harvested from the natural language search query. The menu 1004 of FIG. 11E displays a search query 1108 verbatim, and the system 108 sets the tag selectors 1010,1016,1018 according to how it interprets the query. The user may manually adjust the selectors 1010,1016,1018 as desired. The menu 1004 also comprises the search button 1006, which, once selected, causes the system 108 to perform the facet search as described above. In at least some different example embodiments such as the one depicted in FIGS. 12A and 12B discussed above, various user-selectable images depicting possible facets are presented to the user instead of drop-down menus shown in FIG. 11E.

The facet search as described above may be performed with an artificial neural network trained as described below. In at least some example embodiments, including the embodiments described below, the artificial neural network comprises a convolutional neural network.

In at least some example embodiments, training images are used to train the convolutional neural network. The user generates a facet image training set that comprises the training images by, for example, selecting images that depict a type of object-of-interest shown in conjunction with a type of facet that are common across the training images. For example, in at least some example embodiments the system 108 displays a collection of images to the user, and the user selects which of those images depict a type of facet that the user wishes to train the system 108 to recognize. The system 108 may, for example, show the user a set of potential training images, of which a subset depict a person (the object) having brown hair (the facet); the user then selects only those images showing a person with brown hair as the training images comprising the training set. Different training images may show different people, although all of the training images show a common type of object in conjunction with a common type of facet. The training images may comprise image chips derived from images captured by one of the cameras 169, where a "chip" is a region corresponding to portion of a frame of a selected video recording, such as that portion within a bounding box 310.

Once the facet image training set is generated, it is used to train the artificial neural network to classify the type of facet depicted in the training images comprising the set when a sample image comprising that type of facet is input to the network. An example of a "sample image" is an image comprising part of one of the video recordings searched after the network has been trained, such as in the facet search described above. During training, optimization methods (such as stochastic gradient descent), and numerical gradient computation methods (such as backpropagation) are used to find the set of parameters that minimize the objective function (also known as a loss function). A cross entropy function is used as the objective function in the depicted example embodiments. This function is defined such that it takes high values when it the current trained model is less accurate (i.e., incorrectly classifies facets), and low values when the current trained model is more accurate (i.e., correctly classifies facets). The training process is thus reduced to a minimization problem. The process of finding the most accurate model is the training process, the resulting model with the set of parameters is the trained model, and the set of parameters is not changed once it is deployed. While in some example embodiments the user generates the training set, in other example embodiments a training set is provided to the artificial neural network for training. For example, a third party may provide a training set, and the user may then provide that training set to the artificial neural network.

During training, the system 108 records state data corresponding to different states of the convolutional neural network during the training. In at least some example embodiments, the state data is indexed to index data such as at least one of the types of facet common across the training images, identification credentials of a user who is performing the training, the training images, cameras used to capture the training images, timestamps of the training images, and a time when the training commenced. This allows the state of the convolutional neural network to be rolled back in response to a user request. For example, the system 108 in at least some example embodiments receives index data corresponding to an earlier state of the network, and reverts to that earlier state by loading the state data indexed to the index data for that earlier state. This allows network training to be undone if the user deems it to have been unsuccessful. For example, if the user determines that a particular type of facet is now irrelevant, the network may be reverted to an earlier state prior to when it had been trained to classify that type of facet, thereby potentially saving computational resources. Similarly, a reversion to an earlier network state may be desirable based on time, in which case the index data may comprise the time prior to when undesirable training started, or on operator credentials in order to effectively eliminate poor training done by another user.

In at least some example embodiments, the system 108 may permit two or more users to train the convolutional neural network. More particularly, the system 108 records state data on a per user basis. Different users who are training the network who provide different training inputs to the network may train it differently. Following training the system 108 may accordingly store different states of the neural network (each a "user state"), with the different user states resulting from respective users who have trained the neural network differently. In at least some example embodiments, the different users use at least some of the same training images when training the network. Searching may be done in any one or more ways when multiple user states of the neural network are available.

In at least some example embodiments a search may be done using only a single state of the neural network. For example, a user who has previously trained the network such that the network is in a particular user state may want to use only that user state for the search. The network accordingly outputs only one set of search results, which are generated by applying only that user state.

In some other example embodiments, a search may be done using multiple user states. In at least some of these example embodiments, in response to a facet search the network may output competing sets of facet image search results, with each of those sets (each an "intermediate result") resulting from applying a different user state. The system 108 generates and outputs to the user who requested the search a single, final set of facet image search results based on those intermediate results. This may be done in any number of ways.

The system 108 may assign weights to the competing intermediate search results, and determine the final search results based on those weights. For example, a facet search may be done for persons wearing a red hat. The neural network, having been trained by three different users, has three different user states that the system 108 respectively uses to search video recordings to generate intermediate search results. The first intermediate result comprises Image 1, Image 2, and Image 3; the second intermediate result comprises Image 1, Image 2, and Image 4; and the third intermediate result comprises Image 1, Image 5, and Image 6. As Image 1 appears three times in the intermediate results, it is assigned a weight of 3. Analogously, Image 2 is assigned a weight of 2, and each of Images 3-6 is assigned a weight of 1. The system 108 accordingly determines the final facet image search results as Image 1 being the highest likelihood of depicting a red hat; Image 2 being the second highest likelihood of depicting a red hat; and Images 3-6 tied for lowest likelihood of depicting a red hat. In at least some example embodiments, the system 108 may only display as final results those images from the intermediate results that satisfy a threshold weight. For example, if that threshold weight is 2, then only Images 1 and 2 would be shown as the final results.

As mentioned above, the neural network returns a confidence level in conjunction with each of the images it returns in the search results. When the neural network has multiple user states, the network in each of those states returns a confidence level for each image it returns as a result. In order to determine the confidence level of an image in the final search results, it takes a simple average of the confidence levels for that image returned by the network in each of its user states. For example, in the immediately preceding example and assuming a match likelihood threshold of 25%, for Image 2 the confidence levels returned by the three user states may be 50% for the first intermediate result, 40% for the second intermediate result, and 20% for the third intermediate result, resulting in an overall confidence level of 55%.

Once the neural network is trained, it may be used to classify one or more sample images. For example, after training the neural network may be used to classify a number of sample images taken from video recordings in order to assess whether those sample images depict the type of facet that the network has been trained to identify. The system 108 stores the results of this classification in metadata. After the sample images have been classified, the system 108 may then search any one or more of those sample images in response to facet search commencement input from a user as described above by accessing that metadata to determine which, if any, of the searched sample images depict the facet that the network has been trained to identify. In example embodiments in which the neural network has different user states, the metadata resulting from classifying the sample images may distinguish between those different states and consequently permit searching to be done based on any one or more of those different states.

Certain adaptations and modifications of the described embodiments can be made. For example, with respect to either the client-side video review application 144 (FIGS. 1 and 2), these have been herein described as packaged software installed on the computer terminal 104; however in some alternative example embodiments implementation of the UI can be achieved with less installed software through the use of a web browser application (e.g. one of the other applications 152 shown in FIG. 1). A web browser application is a program used to view, download, upload, surf, and/or otherwise access documents (for example, web pages). In some examples, the browser application may be the well-known Microsoft® Internet Explorer®. Of course other types of browser applications are also equally possible including, for example, Google® Chrome™. The browser application reads pages that are marked up (for example, in HTML). Also, the browser application interprets the marked up pages into what the user sees rendered as a web page. The browser application could be run on the computer terminal 104 to cooperate with software components on the server system 108 in order to enable a computer terminal user to carry out actions related to providing input in order to facilitate identifying same individuals or objects appearing in a plurality of different video recordings. In such circumstances, the user of the computer terminal 104 is provided with an alternative example user interface through which the user inputs and receives information in relation to the video recordings.

Although example embodiments have described a reference image for a search as being taken from an image within recorded video, in some example embodiments it may be possible to conduct a search based on a scanned photograph or still image taken by a digital camera. This may be particularly true where the photo or other image is, for example, taken recent enough such that the clothing and appearance is likely to be the same as what may be found in the video recordings.

It is contemplated that any part of any aspect or embodiment discussed in this specification can be implemented or combined with any part of any other aspect or embodiment discussed in this specification.

Therefore, the above discussed embodiments are considered to be illustrative and not restrictive, and the invention should be construed as limited only by the appended claims.

The invention claimed is:

1. A method comprising:
generating a facet image training set that comprises training images, wherein the training images depict a type of facet shared by the training images, wherein the training images depict the type of facet in conjunction with a type of object shared by the training images;
training, by using the facet image training set, an artificial neural network to classify the type of facet when one or more sample images comprising the type of facet is input to the artificial neural network;
classifying the one or more sample images using the artificial neural network to assess whether the one or more sample images depict the type of facet;
after the one or more sample images have been classified, searching the one or more sample images for the type of facet using different states of the artificial neural network as trained by different users, the searching using the different states occurring independent of each other; and
determining search results based on a weighting of different images found during the searching of the one or more sample images using the different states.

2. The method of claim 1, wherein the artificial neural network comprises a convolutional neural network.

3. The method of claim 1, wherein training the artificial neural network comprises recording state data of the artificial neural network corresponding to the different states of the artificial neural network during the training by the different users.

4. The method of claim 3, wherein the state data is indexed to index data comprising at least one of the type of facet, identification credentials of a user who is performing the training, the training images, cameras used to capture the training images, timestamps of the training images, and a time when the training commenced.

5. The method of claim 3, further comprising:
receiving index data corresponding to an earlier state of the artificial neural network; and
reverting to the earlier state of the artificial neural network by loading the state data indexed to the index data corresponding to the earlier state.

6. The method of claim 3, wherein the searching performed using more than one of the different states results in intermediate search results respectively corresponding to the more than one of the different states, and wherein:
the weighting of the different images is based on how frequently the different images occur in the intermediate search results.

7. The method of claim 1, wherein the type of facet comprises age, gender, a type of clothing, a color of clothing, a pattern displayed on clothing, a hair color, a footwear color, or clothing accessories.

8. The method of claim 1, wherein the type of facet comprises color, make, model, or configuration.

9. The method of claim 1, wherein at least one of the training images comprises an image chip derived from an image captured by a camera.

10. The method of claim 1, wherein classifying the one or more sample images using the artificial neural network to assess whether the one or more sample images depicts the type of facet comprises generating and storing metadata indicating whether the one or more sample images depicts the type of facet, and wherein searching the one or more sample images for the type of facet is performed using the metadata.

11. The method of claim 1, further comprising:
receiving facet search commencement user input indicating that a search for a facet is to commence, wherein the searching is performed in response to receiving the facet search commencement user input; and
displaying, on a display, facet image search results depicting the facet, wherein the facet image search results are selected from one or more video recordings, wherein the facet image search results depict the facet in conjunction with a type of object-of-interest shared by the facet image search results.

12. A method comprising:
receiving facet search commencement user input indicating that a search for a facet is to commence, wherein the facet comprises a data structure that includes a descriptor and a tag, provided in a pair, that describe a particular visual characteristic of an object-of-interest;
in response to the facet search commencement user input, searching one or more video recordings for the facet using different states of an artificial neural network as trained by different users, the searching using the different states occurring independent of each other;
displaying, on a display, facet image search results depicting the facet, wherein the facet image search results are selected from the one or more video recordings, wherein the facet image search results depict the facet in conjunction with a type of object-of-interest shared by the facet image search results;
prior to receiving the facet search commencement user input, displaying a list of facets appearing in object-of-interest search results; and
receiving, as the facet search commencement user input, a selection of the facet comprising the list of facets.

13. The method of claim 12, further comprising, after displaying the facet image search results:
receiving object-of-interest search commencement user input indicating that a search for the object-of-interest is to commence;
in response to the object-of-interest search commencement user input, searching the one or more video recordings for the object-of-interest; and
displaying, on the display, the object-of-interest search results depicting the object-of-interest.

14. The method of claim 13, wherein the one or more video recordings that are searched are the one or more video recordings from which are selected the facet image search results, wherein the object-of-interest search results are selected from the one or more video recordings from which are selected the facet image search results, and wherein the object-of-interest search results depict the object-of-interest and the facet.

15. The method of claim 13, further comprising, after displaying the object-of-interest search results:
receiving updated facet search commencement user input indicating that an updated facet search is to commence;
in response to the updated facet search commencement user input, searching the one or more video recordings from which are selected the object-of-interest search results for a different type or number of facets than were searched in the search for the facet; and
displaying, on the display, updated facet search results depicting the different type or number of facets and the object-of-interest, wherein the updated facet search results are selected from the one or more video recordings from which are selected the object-of-interest search results.

16. The method of claim 12, further comprising, before displaying the facet image search results:
receiving the object-of-interest search commencement user input indicating that a search for the object-of-interest is to commence;
in response to the object-of-interest search commencement user input, searching one or more video recordings for the object-of-interest; and
displaying, on the display, the object-of-interest search results depicting the object-of-interest, wherein the object-of-interest search results are selected from the one or more video recordings,
wherein the facet search commencement user input is received after the object-of-interest search results are displayed, and the one or more video recordings that are searched for the facet comprise the one or more video recordings from which are selected the object-of-interest search results.

17. The method of any claim 12, wherein the facet search commencement user input comprises a natural language text query.

18. A system comprising:
a display;
an input device;
a processor communicatively coupled to the display and the input device; and
a memory communicatively coupled to the processor and having stored thereon computer program code that is executable by the processor, wherein the computer program code, when executed by the processor, causes the processor to perform a method comprising:
generating a facet image training set that comprises training images, wherein the training images depict a type of facet shared by the training images, wherein the training images depict the type of facet in conjunction with a type of object common to the training images;
training, by using the facet image training set, an artificial neural network to classify the type of facet when one or more sample images comprising the type of facet is input to the artificial neural network;
classifying the one or more sample images using the artificial neural network to assess whether the one or more sample images depict the type of facet;
after the one or more sample imaged have been classified, searching the sample image for the type of facet using different states of the artificial neural network as trained by different users, the searching using the different states occurring independent of each other; and
determining search results based on a weighting of different images found during the searching of the one or more sample images using the different states.

19. A non-transitory computer readable medium having stored thereon computer program code that is executable by a processor and that, when executed by the processor, causes the processor to perform a method comprising:
- generating a facet image training set that comprises training images, wherein the training images depict a type of facet shared by the training images, wherein the training images depict the type of facet in conjunction with a type of object common to the training images;
- training, by using the facet image training set, an artificial neural network to classify the type of facet when one or more sample images comprising the type of facet is input to the artificial neural network;
- classifying the one or more sample images using the artificial neural network to assess whether the one or more sample images depict the type of facet;
- after the one or more sample images have been classified, searching the one or more sample images for the type of facet using different states of the artificial neural network as trained by different users, the searching using the different states occurring independent of each other; and
- determining search results based on a weighting of different images found during the searching of the one or more sample images using the different states.

* * * * *